(12) United States Patent
Wickert et al.

(10) Patent No.: US 9,725,545 B2
(45) Date of Patent: Aug. 8, 2017

(54) POROUS POLYMERIC RESINS

(71) Applicant: 3M INNOVATIVE PROPERTIES COMPANY, St. Paul, MN (US)

(72) Inventors: Peter D. Wickert, St. Paul, MN (US); Simon K. Shannon, Woodbury, MN (US); Kannan Seshadri, Woodbury, MN (US); Jerald K. Rasmussen, Woodville, WI (US); James I. Hembre, Plymouth, MN (US); Robert T. Fitzsimons, Jr., Minneapolis, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/204,324

(22) Filed: Mar. 11, 2014

(65) Prior Publication Data

US 2014/0193875 A1   Jul. 10, 2014

Related U.S. Application Data

(62) Division of application No. 12/740,374, filed as application No. PCT/US2008/082396 on Nov. 5, 2008, now Pat. No. 8,710,111.

(Continued)

(51) Int. Cl.
  *C08F 228/02*  (2006.01)
  *B01D 15/00*  (2006.01)
  (Continued)

(52) U.S. Cl.
  CPC ............ *C08F 228/02* (2013.01); *B01D 15/00* (2013.01); *B01D 15/08* (2013.01); *B01J 20/261* (2013.01);
  (Continued)

(58) Field of Classification Search
  CPC .................... B01J 20/261; B01J 20/28092
  See application file for complete search history.

(56) References Cited

U.S. PATENT DOCUMENTS

| | | |
|---|---|---|
| 3,058,594 A | 10/1962 | Hultgren |
| 3,989,649 A | 11/1976 | Kaiho |
| (Continued) | | |

FOREIGN PATENT DOCUMENTS

| | | |
|---|---|---|
| JP | 2003-166982 | 6/2003 |
| JP | 2009-067982 | 4/2009 |

OTHER PUBLICATIONS

Ahn, "Rapid Generation and Control of Microporosity, Bimodal Pore Size Distribution, and Surface Area in Davankov-Type Hyper-Cross-Linked Resins", Macromolecules, 2006, vol. 39, No. 2, pp. 627-632.

(Continued)

*Primary Examiner* — Melissa Rioja
(74) *Attorney, Agent, or Firm* — Jean A. Lown

(57) ABSTRACT

Porous polymeric resins, reaction mixtures and methods that can be used to prepare the porous polymeric resins, and uses of the porous polymeric resin are described. More specifically, the polymeric resins typically have a hierarchical porous structure plus reactive groups that can be used to interact with or react with a variety of different target compounds. The reactive groups can be selected from an acidic group or a salt thereof, an amino group or salt thereof, a hydroxyl group, an azlactone group, a glycidyl group, or a combination thereof.

19 Claims, 2 Drawing Sheets

50 um

Related U.S. Application Data

(60) Provisional application No. 60/986,714, filed on Nov. 9, 2007.

(51) Int. Cl.
| | | |
|---|---|---|
| *B01D 15/08* | (2006.01) | |
| *B01J 20/26* | (2006.01) | |
| *B01J 20/28* | (2006.01) | |
| *C08J 9/26* | (2006.01) | |
| *C08F 224/00* | (2006.01) | |
| *C08F 226/00* | (2006.01) | |
| *B01J 20/285* | (2006.01) | |
| *C08F 226/06* | (2006.01) | |

(52) U.S. Cl.
CPC ........... *B01J 20/267* (2013.01); *B01J 20/285* (2013.01); *C08F 224/00* (2013.01); *C08F 226/06* (2013.01); *C08J 9/26* (2013.01); *B01J 20/28092* (2013.01); *C08J 2201/0462* (2013.01); *C08J 2333/04* (2013.01); *C08J 2333/24* (2013.01)

(56) References Cited

U.S. PATENT DOCUMENTS

| | | |
|---|---|---|
| 4,153,661 A | 5/1979 | Ree |
| 4,157,418 A | 6/1979 | Heilmann |
| 4,432,920 A | 2/1984 | Ishikawa |
| 4,565,663 A | 1/1986 | Errede |
| 4,810,381 A | 3/1989 | Hagen |
| 4,842,739 A | 6/1989 | Tang |
| 4,933,372 A | 6/1990 | Feibush |
| 4,957,943 A | 9/1990 | McAllister |
| 4,971,736 A | 11/1990 | Hagen |
| 5,019,270 A | 5/1991 | Afeyan |
| 5,047,438 A | 9/1991 | Feibush |
| 5,130,343 A | 7/1992 | Frechet |
| 5,168,104 A | 12/1992 | Li |
| 5,288,763 A | 2/1994 | Li |
| 5,292,840 A | 3/1994 | Heilmann |
| 5,334,310 A | 8/1994 | Frechet |
| 5,468,847 A | 11/1995 | Heilmann |
| 5,561,097 A | 10/1996 | Gleason |
| 5,993,935 A | 11/1999 | Rasmussen |
| 6,080,800 A | 6/2000 | Frey |
| 6,323,249 B1 | 11/2001 | Dale |
| 6,379,952 B1 | 4/2002 | Rasmussen |
| 6,693,159 B1 | 2/2004 | Holmes |
| 6,733,715 B2 | 5/2004 | Hozumi |
| 6,897,271 B1 | 5/2005 | Domschke |
| 7,094,369 B2 | 8/2006 | Buiser |
| 7,098,253 B2 | 8/2006 | Rasmussen |
| 7,556,858 B2 | 7/2009 | Rasmussen |
| 7,582,684 B2 | 9/2009 | Rasmussen |
| 7,683,100 B2 | 3/2010 | Rasmussen |
| 8,338,496 B2 | 12/2012 | Rasmussen |
| 2003/0104042 A1 | 6/2003 | Lucast |
| 2003/0171443 A1 | 9/2003 | Erbacher |
| 2003/0225173 A1 | 12/2003 | Albright |
| 2005/0130222 A1 | 6/2005 | Lee |
| 2005/0245624 A1 | 11/2005 | Busson |
| 2005/0261384 A1 | 11/2005 | Rasmussen |
| 2008/0182918 A1 | 7/2008 | Chuda |
| 2009/0178966 A1 | 7/2009 | Nakanishi |
| 2010/0116739 A1 | 5/2010 | Rasmussen |
| 2010/0189915 A1 | 7/2010 | Weiss |
| 2010/0311850 A1 | 12/2010 | Wickert |

OTHER PUBLICATIONS

Drtina, "Highly Cross-linked Azlactone Functional Supports of Tailorable Polarity", Macromolecules, 1996, vol. 29, No. 13, pp. 4486-4489.

Duguan, "Preparation and Properties of High-efficiency Anionic Thickeners", Specialty Petrochemicals, Jul. 2001, No. 4, pp. 5-8 (translation document, pp. 1-10).

Kim, "Synthesis of tailored porous alumina with a bimodal pore size distribution", Materials Research Bulletin, 2004, vol. 39, pp. 2103-2112.

Li, "Hierarchically Porous Bioactive Glass Scaffolds Synthesized with a PUF and P123 Contemplated Approach", Chem. Mater., 2007, vol. 19, No. 17, pp. 4322-4326.

MacIntyre, "Control of Porous Morphology in Suspension Polymerized Poly(divinylbenzene) Resins Using Oligomeric Porogens", Macromolecules, 2004, vol. 37, No. 20, pp. 7628-7636.

Oh, "Adsorptive removal of phenolic compounds by using hypercrosslinked polystyrenic beads with bimodal pore size distribution", Reactive & Functional Polymers, 2003, vol. 57, pp. 103-111.

Rasmussen, "Crosslinked, Hydrophilic, Azlactone-Functional Polymeric Beads: A Two-Step Approach", Reactive Polymers, 1991/1992, vol. 16, pp. 199-212.

Reignier, "Preparation of interconnected poly($\epsilon$-caprolactone) porous scaffolds by a combination of polymer and salt particulate leaching", Polymer, 2006, vol. 47, pp. 4703-4717.

Sherrington, "Preparation, structure and morphology of polymer supports", Chem. Commun., 1998, pp. 2275-2286.

Sorenson, "Preparative Methods of Polymer Chemistry", Interscience Publishers, pp. 214-265, (1968).

Sosnowski, "Polyester Scaffolds with Bimodal Pore Size Distribution for Tissue Engineering", Macromolecular Bioscience, 2006, vol. 6, pp. 425-434.

Sun, "Biporous Polymeric Beads Fabricated by Double Emulsification for High-speed Protein Chromatography", Journal of Applied Polymer Science, 2007, vol. 103, pp. 17-23.

International Search Report for PCT/US2008/082396, 3 pages.

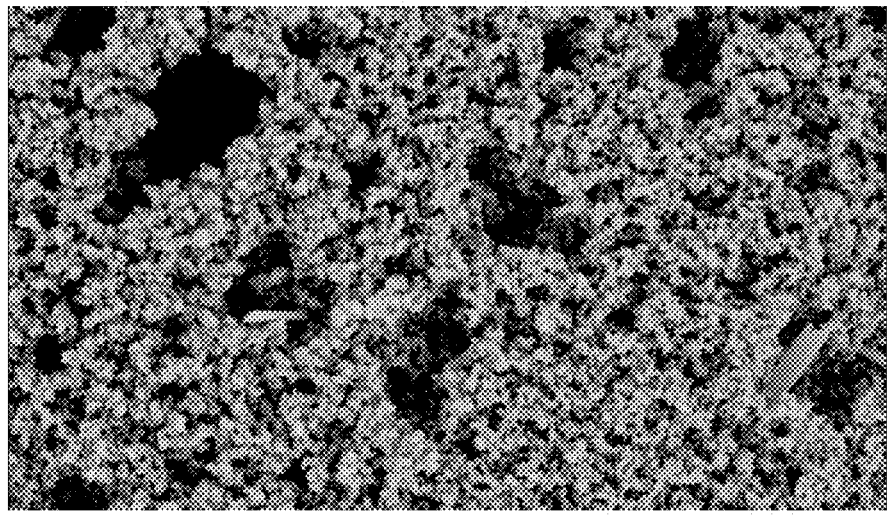
*Fig. 1*  2 μm
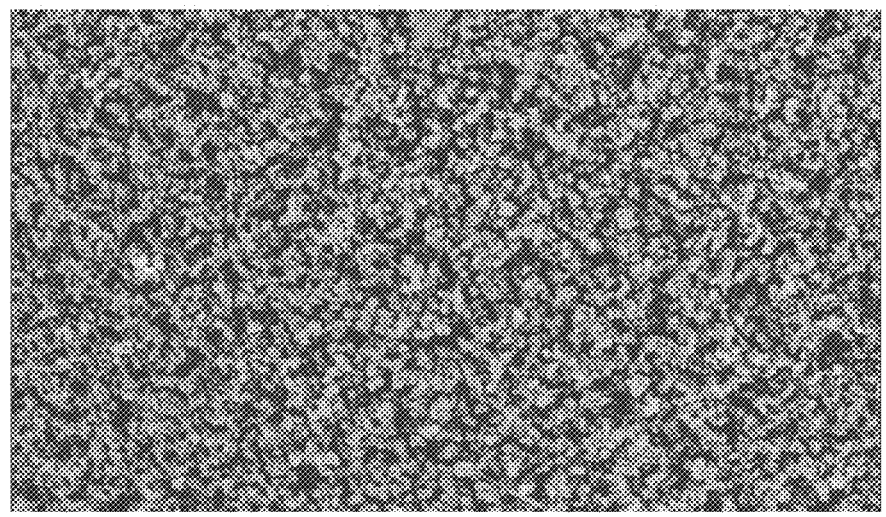
*Fig. 2*  2 μm 50 um 50 um

POROUS POLYMERIC RESINS

CROSS REFERENCE TO RELATED APPLICATION

This application is a divisional application of pending prior U.S. application Ser. No. 12/740,374, filed Apr. 29, 2010, now allowed, which is a national stage filing under 35 U.S.C. §371 of International Application No. PCT/US2008/082396, filed Nov. 5, 2008, which claims the benefit of U.S. Provisional Patent Application No. 60/986,714, filed Nov. 9, 2007, the disclosures of which are incorporated by reference herein in their entireties.

TECHNICAL FIELD

Porous polymeric resins, methods and reaction mixtures for preparing the porous polymeric resins, and various uses of the porous polymeric resins are described.

BACKGROUND

Polymeric resins are widely used for the separation and purification of various target compounds. For example, polymeric resins can be used to purify or separate a target compound based on the presence of an ionic group, based on the size of the target compound, based on a hydrophobic interaction, based on an affinity interaction, or based on the formation of a covalent bond.

In the biotechnology industry, large-scale separation and/or purification of various biomolecules such as proteins, enzymes, vaccines, DNA, RNA, and the like are of great interest. The vast majority of the polymeric resins used for the separation and purification of biomolecules are based on either styrene/divinylbenzene copolymers or crosslinked agarose. The hydrophobic backbone of styrene/divinylbenzene copolymers can be prone to non-specific interactions with a number of materials leading to impure products. Although crosslinked agarose resins are generally less susceptible to non-specific interactions, these materials tend to be fairly soft gels and can have relatively low capacity for many biomolecules.

Improved polymeric resins are needed, particularly for separation and purification of biomolecules.

SUMMARY

Porous polymeric resins, reaction mixtures and methods that can be used to prepare the porous polymeric resins, and various uses of the porous polymeric resins are described. More specifically, the polymeric resins usually have a hierarchical porous structure as well as functional groups that can be used to purify a target compound or to separate a target compound from other molecules in a sample. The polymeric resins are often hydrophilic and can have low non-specific adsorption. In many embodiments, the polymeric resins are in the form of polymeric beads.

In a first aspect, a reaction mixture is provided that can be used to prepare a porous polymeric resin. The reaction mixture contains an aqueous phase composition that includes a) a monomer mixture capable of free radical polymerization, b) dispersed or suspended organic aggregates in the size range of 0.05 to 5 micrometers, and c) an aqueous phase solvent that includes water and optionally a polar organic solvent that is miscible with water. The monomer mixture in the aqueous phase composition includes 1) a crosslinking monomer and 2) a functional monomer. The crosslinking monomer contains a compound of Formula (I)

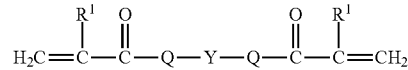

wherein $R^1$ is hydrogen or methyl; Q is oxy or —NH—; and Y is an alkylene or heteroalkylene. The alkylene or heteroalkylene Y group is unsubstituted or substituted with a hydroxyl group. The functional monomer contains (a) an ethylenically unsaturated group and (b) a functional group selected from (1) an acidic group or salt thereof, (2) an amino group or a salt thereof, (3) a hydroxyl group, (4) an azlactone group, (5) a glycidyl group, or (6) a combination thereof.

In a second aspect, a method is provided for preparing a porous polymeric resin. The method includes forming an aqueous phase composition that contains 1) a monomer mixture capable of free radical polymerization, 2) dispersed or suspended organic aggregates in the size range of 0.05 to 5 micrometers, and 3) an aqueous phase solvent that includes water and optionally a polar organic solvent that is miscible with water. The monomer mixture in the aqueous phase composition includes i) a crosslinking monomer and ii) a functional monomer. The crosslinking monomer contains a compound of Formula (I)

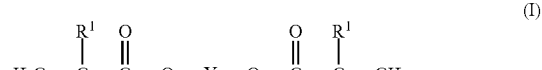

wherein $R^1$ is hydrogen or methyl; Q is oxy or —NH—; and Y is an alkylene or heteroalkylene. The alkylene or heteroalkylene Y group is unsubstituted or substituted with a hydroxyl group. The functional monomer contains (a) an ethylenically unsaturated group and (b) a first functional group selected from (1) an acidic group or salt thereof, (2) an amino group or a salt thereof, (3) a hydroxyl group, (4) an azlactone group, (5) a glycidyl group, or (6) a combination thereof. The method further includes polymerizing the monomer mixture to form a polymeric material that contains the organic aggregates and then removing at least a portion of the organic aggregates from the polymeric material to form the porous polymeric resin.

In a third aspect, a method is provided for purifying or separating a target compound. The method includes forming a porous polymeric resin, as described above, that has a functional group selected from (1) an acidic group or salt thereof, (2) an amino group or salt thereof, (3) a hydroxyl group, (4) an azlactone group, (5) a glycidyl group, or (6) a combination thereof. The method further includes contacting the porous polymeric resin with a sample containing a target compound that reacts with or interacts with at least one of the functional groups of the porous polymeric beads. In some applications, the porous polymeric resin can be positioned within a chromatographic column, on a surface of a filtration medium, or incorporated into a continuous, porous matrix.

In a fourth aspect, another method is provided for purifying or separating a target compound. This method includes forming a porous polymeric resin, as described above, that has a first functional group selected from (1) an acidic group or salt thereof, (2) an amino group or salt thereof, (3) a hydroxyl group, (4) an azlactone group, (5) a glycidyl group, or (6) a combination thereof. The method further includes preparing a modified porous polymeric resin by treating the porous polymeric resin with a modifying agent and converting the first functional group to a second functional group. The modified porous polymeric resin with the second functional group is then contacted with a sample containing the target compound. The target compound reacts or interacts with the second functional group of the modified porous polymeric resin.

In a fifth aspect, a porous polymeric resin is provided. The polymeric resin has a hierarchical porous structure that includes a first set of pores having an average pore diameter less than 200 nanometers and a second set of pores having an average pore diameter greater than 500 nanometers. The porous polymeric resin is the reaction product of an aqueous phase monomer mixture that includes a) a crosslinking monomer and b) a functional monomer. The crosslinking monomer includes a compound of Formula (I)

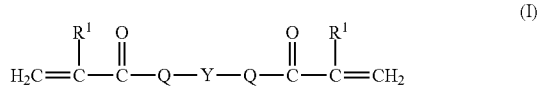

(I)

wherein $R^1$ is hydrogen or methyl; Q is oxy or —NH—; and Y is an alkylene or heteroalkylene, wherein Y is unsubstituted or substituted with a hydroxyl group. The functional monomer contains (a) an ethylenically unsaturated group and (b) a first functional group selected from (1) an acidic group or salt thereof, (2) an amino group or salt thereof, (3) a hydroxyl group, (4) an azlactone group, (5) a glycidyl group, or (6) a combination thereof. All or substantially all of the monomers in the monomer mixture have a lipophilicity index no greater than 20. In some embodiments, the porous polymeric resin is a porous polymeric bead.

The above summary of the present invention is not intended to describe each embodiment or every implementation of the present invention. The Figures, Detailed Description, and Examples that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 1 is a scanning electron micrograph of exemplary porous polymeric beads (prepared in Example 6) having a primary and secondary porous structure.

FIG. 2 is a scanning electron micrograph of a comparative polymeric bead (prepared in Comparative Example 2) that has a primary but not a secondary porous structure.

Figure 3:
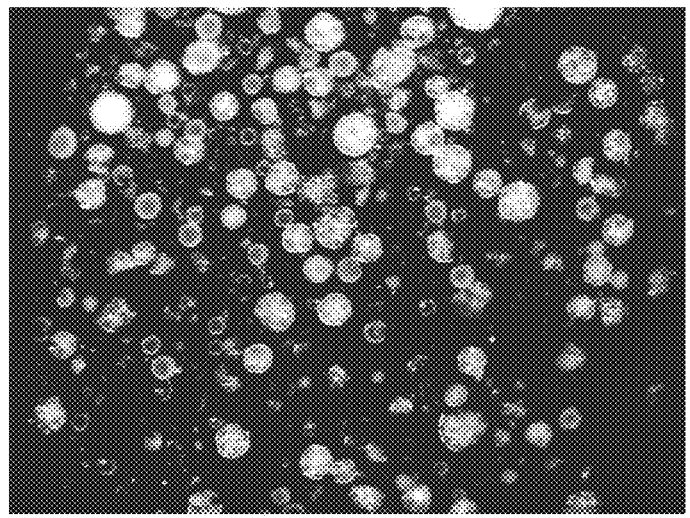
FIG. 3 is an optical micrograph of other exemplary porous polymeric beads (prepared in Example 4) having a primary and secondary porous structure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

Porous polymeric resins, reaction mixtures and methods that can be used to prepare the porous polymeric resins, and uses of the porous polymeric resins are described. More specifically, the polymeric resins are usually hydrophilic and have a hierarchical porous structure plus functional groups that can be used to interact with or react with a variety of different target compounds. The porous polymeric resins, which are often in the form of porous polymeric beads, can be used to purify a desired material or to separate a desired material from other molecules in a sample. In some applications, the porous polymeric resins are positioned within a chromatographic column, on a surface of a filtration medium, or incorporated into a continuous, porous matrix.

The terms "a", "an", and "the" are used interchangeably with "at least one" to mean one or more of the elements being described.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 16 carbon atoms, 1 to 12 carbon atoms, 1 to 10 carbon atoms, 1 to 8 carbon atoms, 1 to 6 carbon atoms, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene typically has 1 to 20 carbon atoms. In some embodiments, the alkylene contains 1 to 10 carbon atoms, 1 to 8 carbon atoms, 1 to 6 carbon atoms, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl.

The term "acyl" refers to a monovalent group of formula —(CO)—R where R is an alkyl and the (CO) denotes that the carbon is attached to the oxygen with a double bond. An exemplary acyl group is acetyl where R is methyl.

The term "acyloxy" refers to a monovalent group of formula —O—(CO)—R where R is an alkyl and (CO) denotes that the carbon is attached to the oxygen with a double bond. An exemplary acyloxy group is acetoxy where R is methyl.

The term "aralkyl" refers to a monovalent group that is a radical of the compound R—Ar where Ar is an aromatic carbocyclic group and R is an alkyl group.

The term "aryl" refers to a monovalent group that is a radical of a carbocyclic aromatic compound. The aryl can have one aromatic ring or can include up to 5 other carbocyclic rings that are connected to or fused to the aromatic ring. The other carbocyclic rings can be aromatic, non-aromatic, or combination thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "azlactone" refers to a monovalent group of formula

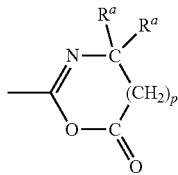

where p is an integer of 0 or 1; and $R^a$ is each independently selected from hydrogen, alkyl, heteroalkyl, aryl, aralkyl, or both $R^a$ groups taken together with a carbon atom to which they are attached form a carbocyclic ring.

The term "carboxy" refers to a monovalent group of formula —(CO)OH where (CO) denotes that the carbon is attached to the oxygen with a double bond.

The term "carboxyalkyl" refers to an alkyl substituted with a carboxy group.

The term "glycidyl" refers to a group of the following formula.

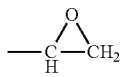

The term "halo" refers to fluoro, chloro, bromo, or iodo.

The term "haloalkyl" refers to an alkyl substituted with a halo group.

The term "heteroalkylene" refers to a divalent alkylene having one or more —$CH_2$— groups replaced with a thio, oxy, or —$NR^b$— where $R^b$ is hydrogen or alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Exemplary heteroalkylene include alkylene oxides or poly(alkylene oxides). That is, the heteroalkylenes include at least one group of formula —(R—O)— where R is an alkylene. As used wherein, the term "alkylene glycol" and "alkylene oxide" are used interchangeable to refer to a divalent group of this formula.

The term "(meth)acryloyl" refers to a group of formula $H_2C=CR^1$—(CO)— where $R^1$ is hydrogen or methyl.

The term "(meth)acrylamido" refers to a group of formula $H_2C=CR^1$—(CO)—NH— where $R^1$ is hydrogen or methyl.

The term "(meth)acryloxy" refers to a group of formula $H_2C=CR^1$—(CO)—O— where $R^1$ is hydrogen or methyl.

The term "(meth)acrylate" refers to both a methacrylate and an acrylate. Similarly, the term "(meth)acrylamide" refers to both a methacrylamide and an acrylamide, the term "(meth)acrylic acid" refers to both methacrylic acid and acrylic acid, and the term "(meth)acryloyl amino acid" refers to both a methacryloyl amino acid and an acryloyl amino acid.

The terms "polymer" or "polymeric" refer to a material that is a homopolymer, copolymer, terpolymer, or the like. Likewise, the terms "polymerize" or "polymerization" refers to the process of making a homopolymer, copolymer, terpolymer, or the like.

The phrase "in the range of" includes the endpoints and all numbers between the endpoints. For example, the phrase in the range of 1 to 10 includes 1, 10, and all numbers between 1 and 10.

The term "room temperature" refers to a temperature in the range of 20° C. to 25° C.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Polymeric resins are provided that are porous. The porous polymeric resins can be in the form of a macroporous polymeric material or a gel-type polymeric material. As used herein, the term "macroporous" refers to polymeric resins that have a permanent porous structure even in the dry state. Although the polymeric resins can swell when contacted with a solvent, swelling is not needed to allow access to the interior of the polymeric resins through the porous structure. As used herein, the terms "gel-type" or "gel" are used interchangeably to refer to polymeric resins that do not have a permanent porous structure in the dry state but that can be swollen by a suitable solvent to allow diffusional access to the interior of the polymeric resins. Both macroporous and gel-type polymeric materials are further described in Sherrington, *Chem. Commun.*, 2275-2286 (1998) and Macintyre et al., *Macromolecules*, 37, 7628-7636 (2004). The terms "macroporous" and "gel-type" are not meant to indicate a particular pore size or range of pore sizes.

The polymeric resins have a hierarchical porous structure. As used herein, the term "hierarchical porous" structure means that the polymeric resins have at least a primary porous structure and a secondary porous structure. The primary porous structure is associated with the bulk polymeric matrix. This primary porous structure, which can be either gel-type or macroporous, is substantially the same porous structure that would result from the polymerization of a reaction mixture similar to that described herein but without the organic aggregates. The primary porous structure often includes a plurality of pores having an average pore diameter that is less than about 200 nanometers (nm). Inclusion of the organic aggregates in the reaction mixture leads to the secondary porous structure. The secondary porous structure often includes a plurality of large, often circular cross-sectional pores (e.g., spherical or partially spherical such as hemispherical cavities or voids) within the resin. The average pore diameter of these large pores is generally greater than about 500 nanometers and some pores can be as large as about 15 to 20 micrometers. These large pores may have an open cell configuration, a closed cell configuration, or a combination thereof. In either configuration, substances such as liquids, modifying agents, or target compounds can move from one pore in the secondary porous structure to another pore in the secondary porous structure. In a closed cell configuration, this movement is through the primary porous structure. The pores of the secondary porous structure may be directly accessible to the exterior of the bead or may be accessible through the primary pore structure.

A hierarchical porous structure can be particularly advantageous for the separation or purification of target compounds having a relatively large molecular weight. More particularly, polymeric resins with a first set of pores having an average pore diameter less than about 200 nanometers and a second set of pores having an average pore diameter greater than about 500 nanometers can be advantageous for purification or separation of biomolecules (i.e., biological molecules). Biomolecules such as enzymes, proteins, nucleic acids, and the like often have a weight average molecular weight that is greater than 5,000 g/mole, greater than 10,000 g/mole, greater than 20,000 g/mole, greater than 50,000 g/mole, or greater than 100,000 g/mole. As the molecular weight increases in the absence of relatively large pores, diffusion of the biomolecule into the interior regions of a polymeric resin often decreases. Typically, the time required for separation and purification of biomolecules with polymeric resins can be shortened by using polymeric resins having relatively large pores such as pores having a diameter greater than about 500 nanometers. However, the size of the pores usually affects the total surface area and capacity of the polymeric resins for purification and separation of one or more target compounds. Polymeric resins having only relatively large pores tend to have a low surface area and low capacity for target compounds. To maximize the capacity of the polymeric resins, smaller pore sizes such as those having a diameter less than about 200 nanometers can be advantageous. That is, pores with a diameter less than about 200 nanometers tend to increase the surface area of the polymeric resins.

The polymeric resin has various functional groups that can be used to react or interact with a target compound. The functional group can be a first functional group selected from (1) an acidic group or salt thereof, (2) an amino group or salt thereof, (3) a hydroxyl group, (4) an azlactone group, (5) a glycidyl group, or (6) a combination thereof. Alternatively, the first functional group can be reacted with a modifying agent to provide a second functional group that is different than the first functional group. The reaction or interaction of the target compound with the polymeric resin or modified polymeric resin can provide the basis for purifying or separating the target compound from other molecules in a sample. In some embodiments, the target compound is the desired material that can be separated and collected using the polymeric resins or modified polymeric resins. In other embodiments, the target compound is an impurity that can be separated from the desired material using the polymeric resins or modified polymeric resins.

The monomers present in the aqueous phase composition are polymerized using a free radical polymerization reaction. As the molecular weight of the polymeric material increases during the polymerization reaction, the resulting polymeric material typically becomes incompatible with the aqueous phase and tends to phase separate. Some of the aqueous phase components usually get trapped within the polymeric material. Subsequent removal of the trapped aqueous phase components often leads to the formation of pores. Different aqueous phase components can result in the formation of different size pores. That is, the aqueous phase components can be selected to provide hierarchically porous polymeric beads having a primary porous structure as well as a secondary porous structure.

The aqueous phase composition can be polymerized to form a monolithic, porous polymeric resin. The monolithic form can have any desired shape or can be divided into particles. Alternatively, the aqueous phase composition can be polymerized to form polymeric beads. For example, polymeric beads can be formed using a reverse phase or inverse suspension polymerization method. With this polymerization method, an aqueous phase composition, which contains the monomer mixture, is dispersed or suspended as droplets in an organic phase that is not miscible with water. As the weight of the polymeric material increases, it typically becomes incompatible with the aqueous phase and tends to phase separate within the droplet. Some of the aqueous phase components usually get trapped within the polymeric material resulting in the formation of pores.

The reaction mixture used to prepare the polymeric resins includes an aqueous phase composition. The aqueous phase composition includes 1) a monomer mixture, 2) dispersed or suspended organic aggregates in the size range of 0.05 to 5 micrometers, and 3) an aqueous phase solvent. The monomer mixture includes i) a crosslinking monomer and ii) a functional monomer. The aqueous phase solvent includes water and optionally a polar organic solvent that is miscible with water.

The crosslinking monomer in the aqueous phase composition is of Formula (I).

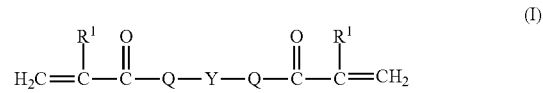

In Formula (I), each $R^1$ is independently hydrogen or methyl; each Q is independently oxy or —NH—; and Y is an alkylene or heteroalkylene. The alkylene or heteroalkylene Y group can be optionally substituted with a hydroxyl group (i.e., group Y can be unsubstituted or substituted with a hydroxyl group). The crosslinking monomer has two (meth)acryloyl groups that can react to crosslink one polymeric chain with another polymeric chain or that can react to crosslink one part of a polymeric chain with another part of the same polymeric chain. The crosslinking agent is selected to be soluble in the aqueous phase composition.

In some embodiments of the crosslinking monomer of Formula (I), both Q groups are equal to —NH— and Y is an alkylene group having 1 to 10, 1 to 8, 1 to 6, or 1 to 4 carbon atoms. The alkylene group can be linear, branched, cyclic, or a combination thereof. Specific examples include, but are not limited to, N,N'-methylenebis(meth)acrylamide, N,N'-ethylenebis(meth)acrylamide, N,N'-(1,2-dihydroxyethylene)bis(meth)acrylamide, N,N'-propylenebis(meth)acrylamide, and N,N'-hexamethylenebis(meth)acrylamide.

In other embodiments of the crosslinking monomer of Formula (I), both Q groups are equal to —NH— and Y is a heteroalkylene having 2 to 20, 2 to 16, 2 to 12, 2 to 10, 2 to 8, 2 to 6, or 2 to 4 carbon atoms. The heteroalkylene can be linear, branched, cyclic, or a combination thereof. Specific examples include, but are not limited to, N,N'-cystaminebis (meth)acrylamide, bis 3-(meth)acrylamidoprop-1-ylpolyethyleneglycol, bis-2-(meth)acrylamidoprop-1-ylpolyethyleneglycol, and N,N'-piperazinebis(meth)acrylamide.

In still other embodiments of the crosslinking monomer of Formula (I), both Q groups are oxy and Y is an alkylene having 2 to 10, 2 to 8, 2 to 6, or 2 to 4 carbon atoms. The alkylene can be linear, branched, cyclic, or a combination thereof. Specific examples include 1,4-butanediol di(meth) acrylate, 1,3-butanediol di(meth)acrylate, 1,5-pentanediol di(meth)acrylate, 1,6-hexanediol di(meth)acrylate, 2,2-dimethylpropanediol di(meth)acrylate, trans-1,4-cyclohexanediol di(meth)acrylate, and ethylene glycol di(meth)acrylate.

In yet further embodiments of the crosslinking monomer of Formula (I), both Q groups are oxy and Y is a heteroalkylene. The heteroalkylene can be linear, branched, cyclic, or a combination thereof. The heteroalkylene is often linear and has one or more alkylene oxide units of formula —(R—O)— where R is an alkylene. The alkylene often has 2, 3, or 4 carbon atoms. Specific example include di(ethylene glycol) di(meth)acrylate, tri(ethylene glycol) di(meth)acrylate, tetra(ethylene glycol) di(meth)acrylate, poly(ethylene glycol) di(meth)acrylate, di(propylene glycol) di(meth)acrylate, and poly(propylene glycol) di(meth)acrylate. Still further examples include alkoxylated diol di(meth)acrylates such as ethoxylated butanediol di(meth)acrylates, propoxylated butanediol di(meth)acrylates, and ethoxylated hexanediol di(meth)acrylates; alkoxylated trimethylolpropane di(meth)acrylates such as ethoxylated trimethylolpropane di(meth)acrylate and propoxylated trimethylolpropane di(meth)acrylate; and alkoxylated pentaerythritol di(meth)acrylates such as ethoxylated pentaerythritol di(meth)acrylate and propoxylated pentaerythritol di(meth)acrylate.

Some of the specifically listed crosslinking monomers are commercially available from various suppliers such as Sigma-Aldrich (Milwaukee, Wis.), Polysciences, Inc. (Warrington, Pa.), and Sartomer (Exeter, Pa.). Alternatively, some of these crosslinking monomers can be synthesized by procedures described in the art such as, for example, in Rasmussen, et al., *Reactive Polymers,* 16, 199-212 (1991/1992).

In some exemplary reaction mixtures, the crosslinking monomer in the aqueous phase is N,N'-methylenebis(meth) acrylamide or a mixture of N,N'-methylenebis(meth)acrylamide plus at least one other crosslinking monomer of Formula (I). At least 10 weight percent, at least 20 weight percent, at least 30 weight percent, at least 40 weight percent, at least 50 weight percent, at least 60 weight percent, at least 70 weight percent, or at least 80 weight percent, at least 80 weight percent, at least 90 weight percent, at least 95 weight percent, at least 98 weight percent, or at least 99 weight percent of the total amount of crosslinking monomer is often N,N'-methylenebis(meth) acrylamide.

In addition to the crosslinking monomer of Formula (I), the monomer mixture can further include an additional crosslinking monomer. For example, the aqueous phase can include a first crosslinking monomer of Formula (I) and a second crosslinking monomer that has three or more ethylenically unsaturated groups. Typically, at least 10 weight percent, at least 20 weight percent, at least 30 weight percent, at least 40 weight percent, at least 50 weight percent, at least 60 weight percent, at least 70 weight percent, at least 80 weight percent, or at least 90 weight percent of the total crosslinking monomer in the aqueous phase composition is of Formula (I).

Some exemplary second crosslinking agents include those having three ethylenically unsaturated groups such as tris [2-(acryloyloxy)ethyl]isocyanurate, trimethylolpropane tri (meth)acrylate and various alkoxylated tri(meth)acrylates. Examples of alkoxylated tri(meth)acrylates include, but are not limited to, alkoxylated trimethylolpropane tri(meth) acrylates such as ethoxylated trimethylolpropane tri(meth) acrylates, propoxylated trimethylolpropane tri(meth)acrylates, and ethylene oxide/propylene oxide copolymer trimethylolpropane tri(meth)acrylates; and alkoxylated pentaerythritol tri(meth)acrylates such as ethoxylated pentaerythritol tri(meth)acrylates.

Other exemplary second crosslinking agents include those having four or more ethylenically unsaturated groups such as alkoxylated tetra(meth)acrylates and alkoxylated penta (meth)acrylates. Examples of alkoxylated tetra(meth)acrylates include alkoxylated pentaerythritol tetra(meth)acrylates such as ethoxylated pentaerythritol tetra(meth) acrylates.

In some exemplary reaction mixtures, the crosslinking monomer in the aqueous phase composition is N,N'-methylenebis(meth)acrylamide or a mixture of N,N'-methylenebis(meth)acrylamide with a second crosslinking monomer having three or more ethylenically unsaturated groups. At least 10 weight percent, at least 20 weight percent, at least 30 weight percent, at least 40 weight percent, at least 50 weight percent, at least 60 weight percent, at least 70 weight percent, at least 80 weight percent, at least 90 weight percent, at least 95 weight percent, at least 98 weight percent, or at least 99 weight percent of the total amount of crosslinking monomer is often N,N'-methylenebis(meth) acrylamide.

The monomer mixture includes at least 1 weight percent crosslinking monomer based on the total weight of monomers in the monomer mixture. When low amounts of the crosslinking monomer are used, the resulting polymeric material tends to be in the form of a gel rather than in the form of macroporous polymeric resin. The rigidity or mechanical strength, which is measured by the differential pressure that the polymeric resins can withstand, tends to increase with the amount of crosslinking monomer included in the monomer mixture. Some monomer mixtures contain at least 2 weight percent, at least 5 weight percent, at least 10 weight percent, at least 15 weight percent, at least 20 weight percent, at least 25 weight percent, or at least 30 weight percent crosslinking monomer.

The monomer mixture often contains up to 99 weight percent crosslinking monomer based on the total weight of monomers in the monomer mixture. When the amount of the crosslinking monomer exceeds 99 weight percent, the reactivity with various target compounds is often diminished because there is a corresponding decrease in the amount of the functional monomer present in the monomer mixture. Some monomer mixtures contain up to 95 weight percent, up to 90 weight percent, up to 85 weight percent, up to 80 weight percent, up to 70 weight percent, up to 65 weight percent, up to 60 weight percent, up to 55 weight percent, up to 50 weight percent, up to 45 weight percent, or up to 40 weight percent crosslinking monomer.

The monomer mixture often contains 1 to 99 weight percent, 10 to 99 weight percent, 10 to 95 weight percent, 10 to 90 weight percent, 20 to 90 weight percent, 30 to 90 weight percent, 20 to 80 weight percent, 30 to 80 weight percent, 30 to 75 weight percent, 25 to 70 weight percent, 25 to 60 weight percent, or 25 to 50 weight percent crosslinking monomer based on the total monomer weight.

In addition to the crosslinking monomer, the monomer mixture includes at least one functional monomer. The functional monomer is a compound that is capable of free radical polymerization and that contains (a) an ethylenically unsaturated group and (b) a functional group selected from (1) an acidic group or salt thereof, (2) an amino group or salt thereof, (3) a hydroxyl group, (4) an azlactone group, (5) a glycidyl group, or (6) a combination thereof. The ethylenically unsaturated group undergoes a free radical polymerization reaction while the functional group can be used to react with or interact with a target compound or a modifying agent.

A first type of functional monomer has an ethylenically unsaturated group as well as a functional group that is an acidic group or a salt thereof. The functional monomer can be a weak acid, a salt of a weak acid, a strong acid, a salt of a strong acid, or a combination thereof. The functional monomer can be in a neutral state but capable of being negatively charged if the pH is adjusted. When the pH is suitably adjusted, the resulting polymeric resin can have negatively charged groups capable of interacting with positively charged groups of the target compound (i.e., the target compound is a cation). That is, the polymeric resin can function as a cation exchange resin. If the functional monomer is in the form of a salt of a weak acid or a salt of a strong acid, the counter ions of these salts can be, but are not limited to, alkali metal ions, alkaline earth metal ions, ammonium ions, or tetraalkylammonium ions.

Some exemplary functional monomers having an acid group or salt thereof include (meth)acrylamidosulfonic acids of Formula (II) or salts thereof.

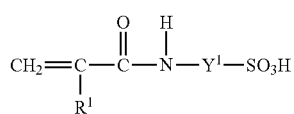

(II)

In Formula (II), $Y^1$ is a straight or branched alkylene having 1 to 10 carbon atoms and $R^1$ is hydrogen or methyl. Exemplary functional monomers according to Formula (II) include, but are not limited to, N-(meth)acrylamidomethanesulfonic acid, 2-(meth)acrylamidoethanesulfonic acid, and 2-(meth)acrylamido-2-methylpropanesulfonic acid. Salts of these acidic monomers can also be used.

Some other exemplary functional monomers having an acid group or salt thereof include other sulfonic acids such as vinylsulfonic acid and 4-styrenesulfonic acid; (meth)acrylamidoalkylphosphonic acids such as 2-(meth)acrylamidoethylphosphonic acid and 3-(meth)acrylamidopropylphosphonic acid; acrylic acid and methacrylic acid; and carboxyalkyl(meth)acrylates such as 2-carboxyethyl(meth)acrylate and 3-carboxypropyl(meth)acrylate. Still other suitable monomers include (meth)acryloylamino acids, such as those described in U.S. Pat. No. 4,157,418 (Heilmann), incorporated herein by reference. Exemplary (meth)acryloylamino acids include, but are not limited to, N-(meth)acryloylglycine, N-(meth)acryloylaspartic acid, N-(meth)acryloyl-β-alanine, and N-(meth)acryloyl-2-methylalanine. Salts of any of these acidic monomers can also be used.

A second type of functional monomer has an ethylenically unsaturated group as well as an amino group or a salt thereof. The amino group can be a primary amino group, secondary amino group, tertiary amino group, or quaternary ammonium group. This type of functional monomer can be a weak base, a strong base, a salt of a weak base, a salt of a strong base, or a mixture thereof. The functional monomer can be in a neutral state but capable of being positively charged if the pH is adjusted. When the pH is suitably adjusted, the resulting polymeric resin can have positively charged groups capable of interacting with negatively charged groups of the target compound (i.e., the target compound is an anion). That is, the polymeric resin can function as an anion exchange resin. If the functional monomer is in the form of a salt, the counter ion can be, but is not limited to, a halide (e.g., chloride), a carboxylate (e.g., acetate or formate), nitrate, phosphate, sulfate, bisulfate, methyl sulfate, or hydroxide. Alternatively, a primary amino group or a secondary amino group can react as a nucleophilic agent with a target compound.

Some exemplary functional monomers having an amino group or salt thereof include amino (meth)acrylates or amino (meth)acrylamides of Formula (III) or quaternary ammonium salts thereof.

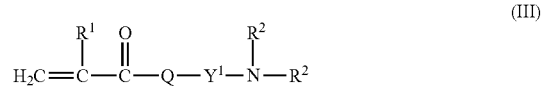

(III)

In Formula (III), $R^1$ is hydrogen or methyl; Q is oxy or —NH—; and $Y^1$ is a single bond or an alkylene (e.g., an alkylene having 1 to 10 carbon atoms, 2 to 6, or 2 to 4 carbon atoms). Each $R^2$ is independently hydrogen, alkyl, hydroxyalkyl (i.e., an alkyl substituted with a hydroxy), aminoalkyl (i.e., an alkyl substituted with an amino), aryl, or aralkyl. Alternatively, the two $R^2$ groups taken together with the nitrogen atom to which they are attached can form a heterocyclic group that is aromatic, partially unsaturated (i.e., unsaturated but not aromatic), or saturated. Such a heterocyclic group can optionally be fused to a second ring that is aromatic (e.g., benzene), partially unsaturated (e.g., cyclohexene), or saturated (e.g., cyclohexane). The counter ions of the quaternary ammonium salts are often halides, sulfates, phosphates, nitrates, and the like.

In some embodiments of Formula (III), both $R^2$ groups are hydrogen. In other embodiments, one $R^2$ group is hydrogen and the other is an alkyl having 1 to 10, 1 to 6, or 1 to 4 carbon atoms. In still other embodiments, at least one of $R^2$ groups is a hydroxy alkyl or an amino alkyl that has 2 to 10, 2 to 6, or 2 to 4 carbon atoms with the hydroxy or amino group being positioned on any of the carbon atoms of the alkyl group except the first. In still other embodiments, at least one of the $R^2$ groups is an aryl having 5 or 6 carbon atoms; or an aralkyl with the alkyl group having 1 to 10 carbon atoms and the aryl group having 5 or 6 carbon atoms. In yet other embodiments, the two $R^2$ groups combine with the nitrogen atom to which they are attached to form a heterocyclic group. The heterocyclic group includes at least one nitrogen atom and can contain other heteroatoms such as oxygen or sulfur. Exemplary heterocyclic groups include, but are not limited to, imidazolyl, piperazinyl, and morpholinyl. The heterocyclic group can be fused to an additional ring such as a benzene, cyclohexene, or cyclohexane. Exemplary heterocyclic groups fused to an additional ring include, but are not limited to, benzimidazolyl.

Exemplary amino (meth)acrylates (i.e., Q in Formula (III) is oxy) include N,N-dialkylaminoalkyl(meth)acrylates such as, for example, N,N-dimethylaminoethyl(meth)acrylate, N,N-diethylaminoethyl(meth)acrylate, N,N-dimethylaminopropyl(meth)acrylate, N-tert-butylaminopropyl(meth)acrylate, and the like.

Exemplary amino (meth)acrylamides (i.e., Q in Formula (III) is —NH—) include, for example, N-(3-aminopropyl)(meth)acrylamide, N-[3-(dimethylamino)propyl](meth)acrylamide, N-(3-imidazolylpropyl)(meth)acrylamide, N-(2-imidazolylethyl)(meth)acrylamide, N-(1,1-dimethyl-3-imidazoylpropyl)(meth)acrylamide, and N-(3-benzimidazolylpropyl)(meth)acrylamide.

Exemplary quaternary salts of the functional monomers of Formula (III) include, but are not limited to, (meth)acrylamidoalkyltrimethylammonium salts such as (meth)acrylamidopropyltrimethylammonium chloride; and (meth)acryloxyalkyltrimethylammonium salts such as 2-(meth)acryloxyethyltrimethylammonium chloride, and 2-(meth)acryloxyethyltrimethylammonium methyl sulfate.

A third type of functional monomer has an ethylenically unsaturated group as well as a hydroxyl group. The hydroxyl group on the polymeric resin can react directly with the target compound or can be reacted with a modifying agent to provide a different type of functional group for interaction with the target compound. The hydroxyl group can often undergo a condensation reaction with a target compound or a modifying agent. For example, a hydroxyl group can react with a target compound or with a modifying agent having a carboxy group (—COOH) to form an ester-containing material. That is, the reaction results in the formation of a carbonyloxy linkage group that covalently bonds the target compound or the modifying agent to the polymeric resin. For example, a protein or other biomolecule can be covalently bonded to the polymeric resin. The attached protein or biomolecule can function as an affinity ligand that can then interact with a complementary biomolecule. An affinity ligand is a compound that can bind another molecule. For example, a bound antigen (i.e., the antigen is the modifying agent) can interact with an antibody (i.e., the antibody is the target compound) or a bound antibody (i.e., the antibody is the modifying agent) can interact with an antigen (i.e., the antigen is the target compound).

Suitable hydroxy-containing monomers include hydroxy substituted alkyl(meth)acrylates, hydroxy substituted alkyl (meth)acrylamides, or vinyl alcohols. Specific hydroxy-containing monomers include, but are not limited to, 2-hydroxyethyl(meth)acrylate, 3-hydroxylpropyl(meth)acrylate, 4-hydroxybutyl(meth)acrylate, glycerol (meth)acrylate, N-[tris(hydroxymethyl)methyl]acrylamide, vinyl benzylalcohol, and hydroxymethyl(meth)acrylamide.

A fourth type of functional monomer has an ethylenically unsaturated group as well as an azlactone group. The azlactone group can undergo a ring-opening reaction with a target compound or a modifying agent having a nucleophilic group. Suitable nucleophilic groups for reacting with an azlactone group include, but are not limited to, primary amino groups, secondary amino groups, and hydroxyl groups. The reaction of the azlactone group with a nucleophilic group of the target compound or modifying agent usually results in the formation of a linkage group that attaches the target compound or the modifying agent to the polymeric resin. The linkage group formed by ring-opening of the azlactone group often contains the group —(CO)NHC$(R^a)_2(CH_2)_p(CO)$— where $R^a$ is an alkyl such as methyl and (CO) denotes a carbonyl. The reaction of azlactone-functional resins with a variety of nucleophilic compounds (e.g., target compounds or modifying agents) is further described in U.S. Pat. No. 5,292,840 (Heilmann et al.), U.S. Pat. No. 5,561,097 (Gleason et al.), and U.S. Pat. No. 6,379,952 (Rasmussen et al.).

After reaction with a modifying agent, polymeric resins that originally contained azlactone groups can be used to purify or separate target compounds based on a variety of interactions or reactions. For example, modified polymeric resins can function as affinity resins, ion exchange resins, hydrophobic interaction resins, reverse phase resins, size exclusion resins, chelating resins, cell selection resins, immobilized enzyme resins, mixed mode resins, and the like.

Affinity resins can be prepared by reacting an azlactone group on the polymeric resins with a nucleophilic group of an affinity ligand (i.e., the modifying agent is an affinity ligand having a nucleophilic group). More particularly, an amino group of a biomolecule can react with the azlactone group to covalently attach the biomolecule to the polymeric resin. The attached biomolecule can interact with a complementary biomolecule. Exemplary affinity ligands include an antigen that can bind to a corresponding (i e, complementary) antibody or an antibody that can bind to a corresponding (i.e., complementary) antigen. Other exemplary affinity ligands include a DNA or RNA fragment that can bind with a complementary DNA or RNA fragment and a lectin that can bind with a compound or biomolecule containing a carbohydrate moiety.

Ion exchange resins can be prepared by reacting an azlactone group on the polymeric resin with a modifying agent having both a nucleophilic group and a second group that is basic, acidic, or a salt thereof. The nucleophilic group reacts with the azlactone group resulting in the attachment of the modifying agent having an ionic group (i.e., acidic group, basic group, or salt thereof) to the polymeric resin. Suitable modifying agents having both a nucleophilic group and an ionic group include, but are not limited to, 2-aminoethylsulfonic acid or aminopropyldimethylamine.

Hydrophobic interaction resins can be prepared by reacting an azlactone group on a polymeric resin with a modifying agent having both a nucleophilic group and a second group that is hydrophobic. The nucleophilic group reacts with the azlactone group resulting in the attachment of the modifying agent having a hydrophobic group to the polymeric resin. Suitable modifying agents having both a nucleophilic group and a hydrophobic group include, but are not limited to, benzylamine, butylamine, hexylamine, or phenethylamine With hydrophobic interaction resins, the eluent is often an aqueous-based salt solution. Hydrophobic interaction resins can be used, for example, for purifying or separating relatively large molecules such as proteins.

Reverse phase resins can be prepared using similar modifying agents to those used to prepare hydrophobic interaction resins. That is, reverse phase resins can be prepared by reacting an azlactone group on a polymeric resin with a modifying agent having a nucleophilic group and a second group that is hydrophobic. The nucleophilic group reacts with the azlactone group resulting in the attachment of the modifying agent having a hydrophobic group to the polymeric resin. Suitable modifying agents having a nucleophilic group and a hydrophobic group include, for example, an alkyl amine having at least 8 carbon atoms, at least 10 carbon atoms, at least 12 carbon atoms, or at least 16 carbon atoms. The alkyl amine can be, for example, octyldecylamine With reverse phase interaction resins, the eluent is usually an organic solvent rather than an aqueous-based salt solution. Further, reverse phase resins are typically used for the separation or purification of relatively small molecules rather than proteins.

Size exclusion resins can be prepared by reacting an azlactone group on the polymeric resin with a modifying agent having both a nucleophilic group and a second group that is a non-interactive or neutral group. The nucleophilic group reacts with the azlactone group resulting in the attachment of the modifying agent having a non-interactive or neutral group to the polymeric bead. Suitable modifying agents having both a nucleophilic group and a non-interactive or neutral group include, but are not limited to, ethanolamine and ammonia.

Chelating resins can be prepared by reacting an azlactone group on the polymeric resin with a modifying agent having both a nucleophilic group and a second group that is metal-chelating. The nucleophilic group reacts with the azlactone group resulting in the attachment of the modifying agent having a metal-chelating group. Suitable modifying agents include, but are not limited to, iminodiacetic acid, N-(3-aminopropyl)iminodiacetic acid, and N-(2-hydroxyethyl)iminodiacetic acid. The metal-chelating group, after chelation of a metal ion, can interact, for example, with certain groups on proteins such as histidine groups.

Cell selection resins can be prepared by reacting an azlactone group on the polymeric resin with an antibody to a cell surface marker. That is, the antibody often has a nucleophilic group that can react with the azlactone group to attach the antibody to the polymeric resin. The antibody can in turn bind with a cell surface marker on the cell resulting in the attachment of the cell to the polymeric resin. Cell selection resins can be used, for example, to purify or separate stem cells, blood cells, or bacteria.

Immobilized enzyme resins can be prepared by reacting an azlactone group on the polymeric resin with a nucleophilic group of an enzyme to attach the enzyme to the polymeric resin. For example, the enzyme can be Penicillin G-acylase or glucoamylase Immobilized enzyme resins can be used as catalysts for various reactions.

Mixed mode resins can be prepared by reacting an azlactone group with modifying agents having a nucleophilic group plus additional groups that can impart two or more interaction modes to the polymeric resins. The two or more modes of interaction can be any of those mentioned above. For example, the azlactone group can be reacted with a modifying agent such as phenylalanine where the amino group would function as the nucleophilic group, the phenyl group would function as a hydrophobic group, and the carboxy group would function as an ionic group.

Exemplary functional monomers having an azlactone group include, but are not limited to, vinyl alkylazlactones such as 2-vinyl-4,4-dimethylazlactone (also called 2-vinyl-4,4-dimethyl-2-oxazolin-5-one), 2-(4-vinylphenyl)-4,4-dimethylazlactone, 2-isopropenyl-4,4-dimethylazlactone, 2-vinyl-4-ethyl-4-methyl-2-oxazolin-5-one, and 2-vinyl-4,4-dimethyl-1,3-oxazin-6-one.

Yet other functional monomers have an ethylenically unsaturated group as well as a glycidyl group. The glycidyl group can undergo a ring-opening reaction with a target compound or a modifying agent having a nucleophilic group. Suitable nucleophilic groups for reacting with a glycidyl group include, but are not limited to, primary amino groups, secondary amino groups, thiol groups, and carboxy groups. The reaction of the glycidyl group with a nucleophilic group of the target compound or modifying agent usually results in the formation of a linkage group that functions to attach the target compound or modifying agent to the polymeric resin. The linkage group formed by ring-opening of the glycidyl group often contains the group —C(OH)HCH$_2$NH— when the glycidyl group is reacted with a primary amino group, C(OH)HCH$_2$S— when the glycidyl group is reacted with a thiol group, or —C(OH)HCH$_2$O(CO)— when the glycidyl group is reacted with a carboxy group.

After modification by reaction with a modifying agent, polymeric resins with glycidyl groups can be used to purify or separate target compounds based on a variety of interactions or reactions. For example, these modified polymeric resins can function as affinity resins, ion exchange resins, hydrophobic interaction resins, reverse phase resins, size exclusion resins, chelating resins, cell selection resins, immobilized enzyme resins, mixed mode resins, and the like. These different types of resins can be prepared from polymeric resins with glycidyl groups using similar reactions to those described above for polymeric resins with azlactone groups.

Exemplary monomers having a glycidyl group include, but are not limited to, glycidyl(meth)acrylate.

Still other functional monomers have a combination of two or more functional groups selected from (1) an acidic group or salt thereof, (2) an amino group or salt thereof, (3) a hydroxyl group, (4) an azlactone group, or (5) a glycidyl group. Exemplary functional monomers having multiple and different types of reactive groups are 3-(meth)acryloxy-2-hydroxypropyltrimethylammonium chloride and 2-(meth)acrylamidoglycolic acid. Each functional group can react or interact as described above.

The monomer mixture includes at least 1 weight percent of the functional monomer based on the total weight of monomers in the monomer mixture. When lower levels of the functional monomer are used, the resulting polymeric material often has a diminished number of functional sites for reacting or interacting with a target compound or modifying agent. Some monomer mixtures contain at least 2 weight percent, at least 5 weight percent, at least 10 weight percent, at least 15 weight percent, at least 20 weight percent, at least 25 weight percent, at least 30 weight percent, at least 35 weight percent, at least 40 weight percent, or at least 50 weight percent of the functional monomer.

The monomer mixture often contains no more than 99 weight percent of the functional monomer based on the total weight of the monomers. When high levels of the functional monomer are used, the resulting primary porous structure of the polymeric material tends to be a gel rather than macroporous. That is, high levels of functional monomers are often accompanied by a corresponding decrease in the amount of crosslinking monomer. The rigidity and mechanical strength of the polymeric resins tends to correlate with the amount of crosslinking monomer. Some monomer mixtures contain no greater than 95 weight percent, no greater than 90 weight percent, no greater than 85 weight percent, no greater than 80 weight percent, no greater than 75 weight percent, no greater than 70 weight percent, no greater than 65 weight percent, no greater than 60 weight percent, no greater than 55 weight percent, no greater than 50 weight percent, no greater than 45 weight percent, or no greater than 40 weight percent of the functional monomer.

Some monomer mixtures contain 1 to 99 weight percent, 1 to 95 weight percent, 1 to 90 weight percent, 5 to 90 weight percent, 10 to 90 weight percent, 20 to 90 weight percent, 30 to 90 weight percent, 30 to 80 weight percent, 40 to 90 weight percent, 40 to 80 weight percent, 50 to 80 weight percent, or 60 to 80 weight percent of the functional monomer based on the total monomer weight. The amount of functional monomer and crosslinking monomer can be varied to provide polymeric resins with the desired combination of mechanical strength, porosity, and capacity for reacting or interacting with target compounds or modifying agents.

For applications such as the preparation of ion exchange resins, monomer mixtures containing 25 to 75 weight percent of the functional monomer and 25 to 75 weight percent of the crosslinking monomer often provide the best balance of target compound capacity and mechanical strength. Some exemplary monomer mixtures used to prepare ion exchange resins include 35 to 75 weight percent of the functional monomer and 25 to 65 weight percent of the crosslinking monomer, 40 to 75 weight percent of the functional monomer and 25 to 60 weight percent of the crosslinking monomer, 50 to 75 weight percent of the functional monomer and 25 to 50 weight percent of the crosslinking monomer, or 60 to 70 percent of the functional monomer and 30 to 40 weight percent of the crosslinking monomer.

For applications such as the preparation of affinity resins, hydrophobic interaction resins, reverse phase resins, or immobilized enzyme resins, the monomer mixtures often contain 1 to 20 weight percent of the functional monomer and 80 to 99 weight percent of the crosslinking monomer. Some exemplary monomer mixtures used for these types of resins can include 1 to 15 weight percent of the functional monomer and 85 to 99 weight percent of the crosslinking monomer, 5 to 15 weight percent of the functional monomer and 85 to 95 weight percent of the crosslinking monomer, 5 to 20 weight percent of the functional monomer and 80 to 95 weight percent of the crosslinking monomer, or 1 to 10 weight percent of the functional monomer and 90 to 99 weight percent of the crosslinking monomer.

Although some monomer mixtures are free of monomers other than the crosslinking monomer and the functional monomer, other monomer mixtures include a hydrophilic co-monomer having a single ethylenically unsaturated group but without a functional group selected from (1) an acidic group or salt thereof, (2) an amino group or salt thereof, (3) a hydroxyl group, (4) an azlactone group, (5) a glycidyl group, or (6) a combination thereof. The hydrophilic co-monomer can be added, for example, for the purpose of adjusting the functional monomer content while maintaining the amount of crosslinking monomer constant. That is, the functional monomer content can be altered without significantly changing the amount of crosslinking or the rigidity of the polymeric resins. Additionally, the hydrophilic character of the polymeric resins can be altered with the use of these co-monomers. Suitable hydrophilic comonomers include, but are not limited to, acrylamide, methacrylamide, dimethylacrylamide, N-isopropylacrylamide, diacetoneacrylamide, N-vinylpyrrolidone, and N-vinylacetamide.

Suitable hydrophilic monomers are typically present in amounts no greater than 50 weight percent based on the total weight of the monomers in the monomer mixture. In some reaction mixtures, the monomer mixture contains no greater than 40 weight percent, no greater than 30 weight percent, no greater than 20 weight percent, no greater than 10 weight percent, no greater than 5 weight percent, no greater than 2 weight percent, or no greater than 1 weight percent hydrophilic monomer based on the total weight of monomers.

In many embodiments, all or substantially all of the monomers in the monomer mixture have a lipophilicity index less than or equal to 20. As used herein, the term "lipophilicity index" or "LI" refers to an index for characterizing the hydrophobic or hydrophilic character of a monomer. The lipophilicity index is determined by partitioning a monomer in equal volumes (1:1) of a non-polar solvent (e.g., hexane) and a polar solvent (e.g., a 75:25 acetonitrile-water solution). The lipophilicity index is equal to the weight percent of the monomer remaining in the non-polar phase after partitioning. Monomers that are more hydrophobic tend to have a higher lipophilicity index; similarly, monomers that are more hydrophilic tend to have a lower lipophilicity index. Measurement of lipophilicity index is further described in Drtina et al., *Macromolecules*, 29, 4486-4489 (1996).

If all or substantially all of the monomers in the monomer mixture have a lipophilicity index that is less than or equal to 20, the resulting polymeric resins tend to be hydrophilic. Hydrophilic polymeric resins tend to have low non-specific binding. As used herein with reference to the lipophilicity index of the monomer mixture being less than or equal to 20, the term "substantially all" means any monomer present with a lipophilicity index greater than 20 is present as an impurity. Any impurity with a lipophilicity index greater than 20 is present in an amount less than 2 weight percent, less than 1 weight percent, less than 0.5 weight percent, less than 0.2 weight percent, or less than 0.1 weight percent based on the total weight of the monomers in the monomer mixture. In some resins, all or substantially all of the monomers in the monomer mixture have a lipophilicity index no greater than 15, no greater than 10, no greater than 5, no greater than 3, or no greater than 1.

The aqueous phase composition usually contains at least 4 weight percent monomer mixture based on the total weight of the aqueous phase composition (e.g., monomer mixture, organic aggregates, and aqueous phase solvent). In some embodiments, the aqueous phase composition can contain at least 10 weight percent or at least 15 weight percent monomer mixture. The aqueous phase composition usually contains up to 50 weight percent monomer mixture based on the total weight of the aqueous phase composition. In some embodiments, the aqueous phase composition can contain up to 40 weight percent, up to 30 weight percent, up to 25 weight percent, or up to 20 weight percent monomer mixture. For example, the aqueous phase composition can contain 5 to 50 weight percent, 5 to 40 weight percent, 5 to 30 weight percent, 5 to 25 weight percent, 5 to 20 weight percent, or 10 to 20 weight percent monomer mixture based on the total weight of the aqueous phase composition.

In addition to the monomer mixture that is capable of undergoing free radical polymerization, the aqueous phase includes dispersed or suspended organic aggregates. Any suitable organic aggregates in the size range of 0.05 to 5 micrometers can be used as long as that the organic aggregates are not soluble in the aqueous phase and the organic aggregates do not coagulate or completely coalesce when added to the aqueous phase composition. Some coalescence of the organic aggregates may occur, however, leading to pores that are larger than the size of the original organic aggregates. The organic aggregates are usually added to the aqueous phase composition in the form of a water-based emulsion or water-based dispersion.

The organic aggregates often have a size of at least 0.05 micrometers, at least 0.1 micrometers, at least 0.2 micrometers, at least 0.5 micrometers, or at least 1 micrometer. The organic aggregates usually have a size no greater than 5 micrometers, no greater than 4 micrometers, no greater than 3 micrometers, no greater than 2 micrometers, or no greater than 1 micrometer. For example, the organic aggregates can be in the size range of 0.05 to 5 micrometers, in the range of 0.05 to 3 micrometers, in the range of 0.05 to 2 micrometers, in the range of 0.05 to 1 micrometers, in the range of 1 to 5 micrometers, in the range of 1 to 3 micrometers, or in the range of 1 to 2 micrometers. The organic aggregates initially get entrapped within the polymeric material as the molecular weight of the polymeric material increases. The organic aggregates are at least partially removed from the polymeric resins to provide the secondary porous structure having pores with an average diameter that is usually greater than about 500 nanometers.

Some suitable organic aggregates have a hydrophilic group that is connected to a hydrophobic group. When the organic aggregates are placed in an aqueous medium, a water-based emulsion or water-based dispersion is formed. For example, a hydrocarbon hydrophobic group can be connected to a hydrophilic group such as a poly(alkylene oxide). That is, some of the organic aggregates are alkoxylated materials. In some exemplary alkoxylated material, at least 30 weight percent, at least 40 weight percent, at least 50 weight percent, or at least 60 weight percent of the alkoxylated material is hydrophilic with the remainder being hydrophobic. Exemplary water-based emulsions or water-based dispersions containing long chain ethoxylated alcohols are commercially available from Baker Petrolite (Sugar Land, Tex.) under the trade designations PETROLITE and UNITHOX. More specifically, UNITHOX D-100 has 25 weight percent solids and contains organic aggregates having an average particle size of about 0.5 micrometers with the organic aggregates being about 50 weight percent hydrophilic and about 50 weight percent hydrophobic. PETROLITE D-110 has 10 weight percent solids and contains organic aggregates having an average particle size of about 0.1 micrometers. PETROLITE D-1038 has 10 weight percent solids and contains organic aggregates having an average particle size of about 0.1 micrometers. UNITHOX D-300 has 23 weight percent solids and contains organic aggregates having an average particle size of 0.5 micrometers with the organic aggregates being about 50 weight percent hydrophilic and about 50 weight percent hydrophobic.

Other suitable water-based emulsions or water-based dispersions contain organic aggregates that are waxes stabilized using surfactants. For example, a wax can be dispersed in an aqueous medium using an alkoxylated hydrocarbon as the surfactant. More specifically, PETROLITE D-800 has 50 weight percent solids and contains organic aggregates that include a paraffin wax that is stabilized using an ethoxylated hydrocarbon. The organic aggregate has an average particle size of 0.7 micrometers. PETROLITE D-900 has 40 weight percent solids and contains organic aggregates that include a microcrystalline wax that is stabilized with an ethoxylated hydrocarbon. The organic aggregate has an average particle size of 0.7 micrometers. Other wax emulsions and dispersions are available from a variety of suppliers. For example, other wax emulsions are commercially available from Michelman (Cincinnati, Ohio) under the trade designation MICHEM and from Lubrizol (Wickliffe, Ohio) under the trade designation LIQUILUBE.

Still other suitable water-based emulsion or water-based dispersions contain organic aggregates that are polymers stabilized using surfactants. For example, a hydrophobic polymer such as polystyrene, poly(meth)acrylate, polyvinylacetate, or rubber can be stabilized with a surfactant to provide a water-based emulsion. Specific examples include, but are not limited to, polystyrene or polystyrene copolymer emulsions or latexes, poly(meth)acrylate emulsions or latexes, rubber emulsions or latexes, polyvinylacetate emulsions or latexes, and the like. Methods for the preparation of these emulsions or dispersions are well-known in the art. For example, procedures for the emulsion polymerization of acrylonitrile, methylacrylate, styrene, vinyl acetate, and a variety of other monomers are described in W. R. Sorenson and T. W. Campbell, "Preparative Methods of Polymer Chemistry", pp. 214-265, Interscience Publishers, 1968. Procedures for the preparation of acrylic microsphere dispersions are described in U.S. Patent Application Publication No. 2003/0104042 (Lucast et al.). In addition, useful emulsions and dispersions are available from a variety of suppliers such as Rohm and Haas (Philadelphia, Pa.), Cray Valley (Paris, France), Lubrizol (Wickliffe, Ohio), and BASF (Florham Park, N.J.).

The aqueous phase composition typically contains up to 10 weight percent organic aggregates based on the total weight of the aqueous phase composition. In many examples, the aqueous phase composition contains up to 8 weight percent, up to 6 weight percent, or up to 5 weight percent organic aggregates. The amount of the organic aggregates is often at least 0.5 weight percent, at least 1 weight percent, at least 2 weight percent, or at least 3 weight percent based on the weight of the aqueous phase composition. Some aqueous phase compositions contain 0.5 to 10 weight percent organic aggregates, 1 to 10 weight percent organic aggregate, or 0.5 to 5 weight percent organic aggregates.

In addition to the monomer mixture and the organic aggregates, the aqueous phase composition contains an aqueous phase solvent that includes water and optionally a polar organic solvent that is miscible with water. As used herein with reference to the polar organic solvent, the term "miscible" means that the polar organic solvent is predominately soluble in water or compatible with water. Generally, at least 95 weight percent, at least 97 weight percent, at least 98 weight percent, at least 99 weight percent, at least 99.5 weight percent, at least 99.8 weight percent, or at least 99.9 weight percent of the polar organic solvent is soluble in water.

Any water used in the aqueous phase solvent can be tap water, well water, deionized water, spring water, distilled water, sterile water, or any other suitable type of water. As used herein, the term "polar organic solvent" refers to a water-miscible organic solvent. The polar organic solvent is typically capable of hydrogen bonding and forms a single phase when mixed with water. The polar organic solvent is typically not reactive with the monomers present in the aqueous phase composition but can improve the solubility of some of the monomers such as the crosslinking monomer in the aqueous phase composition. The polar organic solvent can influence the phase separation behavior of the forming polymer and influence the primary pore structure characteristics (i.e., primary porous structure) of the resulting polymeric material.

In some embodiments, the polar organic solvent is a mono-alcohol (i.e., an alcohol with a single hydroxyl group) having 1 to 10 carbon atoms, 1 to 6 carbon atoms, or 1 to 4 carbon atoms. Suitable mono-alcohols include, but are not limited to, methanol, ethanol, n-propanol, iso-propanol, n-butanol, iso-butanol, tert-butanol, cyclohexanol, or combinations thereof. Some mono-alcohols can function as a porogen and can contribute, at least partially, to the primary pore structure of the porous polymeric material. More particularly, in addition to functioning as a solvent, some mono-alcohols can increase the number of pores having a diameter less than about 200 nanometers.

Other polar organic solvents can be used in combination with the mono-alcohol or in place of the mono-alcohol. These other suitable polar organic solvents include, but are not limited to, dimethylsulfoxide, dimethylformamide, dimethylacetamide, tetrahydrofuran, acetone, N-methylpyrrolidone, and acetonitrile.

When used, the polar organic solvent often is present in an amount of at least 10 weight percent based on a total weight of the aqueous phase solvent. In some embodiments, at least 20 weight percent, at least 30 weight percent, at least 40 weight percent, or at least 50 weight percent of the aqueous phase can be a polar organic solvent. Up to 80 weight percent, up to 70 weight percent, up to 60 weight percent, or up to 50 weight percent of the aqueous phase solvent can be the polar organic solvent. For example, the amount of the polar organic solvent can be in the range of 10 to 80 weight percent, 20 to 80 weight percent, 30 to 80 weight percent, 40 to 80 weight percent, or 50 to 80 weight percent of the aqueous phase solvent.

The selection of the polar solvent, the functional monomers, and the crosslinking monomer can influence whether the resulting polymeric resin is a gel-type resin or a macroporous resin. If the aqueous phase is a good solvent for the resulting polymeric material that forms within the aqueous phase, the resulting polymeric resin is more likely to be a gel-type resin. If the aqueous phase is not a particularly good solvent for the resulting polymeric material that forms within the aqueous phase, the resulting polymeric resin is more likely to be a macroporous resin.

The aqueous phase composition can also optionally include other water-soluble components such as a porogen that can modify the primary pore structure of the resulting polymeric resin. More particularly, porogens can be added that increase the number of pores having a diameter less than about 200 nanometers. The porogen is usually a solid or a liquid that is miscible with the monomer mixture within the aqueous phase composition. Useful porogens generally do not partition between the aqueous phase composition and the non-polar organic solvent, when used, to any appreciable extent (i.e., the porogen is not extracted in any appreciable amount from the aqueous phase composition into the non-polar organic solvent). For example, less than 5 weight percent, less than 4 weight percent, less than 3 weight percent, less than 2 weight percent, or less than 1 weight percent of the porogen can be extracted from the aqueous phase composition into the non-polar organic solvent such as toluene, heptane, or the like.

Some suitable porogens are of Formula (IV)

wherein $R^3$ is hydroxy, alkoxy, carboxy, acyloxy, or halo; each $R^4$ is independently an alkylene having 1 to 4 carbon atoms; $R^5$ is hydrogen, alkyl, carboxyalkyl, acyl, or haloalkyl; and q is an integer of 1 to 1,000.

Exemplary porogens include, but are not limited to, polyethylene glycols and polypropylene glycols having hydroxy end groups ($R^3$ is hydroxy and $R^5$ is hydrogen in Formula (IV)). The weight average molecular weight of the polyethylene glycol and polypropylene glycol is often no greater than 10,000 g/mole, no greater than 8,000 g/mole, no greater than 6,000 g/mole, no greater than 4,000 g/mole, no greater than 1,000 g/mole, no greater than 800 g/mole, no greater than 600 g/mole, or no greater than 400 g/mole.

Other suitable porogens include aliphatic, water-soluble compounds having at least three hydroxyl groups. Exemplary porogens include monosaccharides, disaccharides, and polysaccharides such as glucose, ribose, sucrose, maltose, lactose, maltotriose, and dextran; derivatives of monosaccharides such as gluconic acid, mannitol, glucuronic acid, glucosamine, and the like; and polyols such as glycerol, trimethylolpropane, pentaerithritol, and the like.

In the embodiments where the polymeric resin is in the form of polymeric beads, the reaction mixture also includes an organic phase composition. The aqueous phase composition is dispersed or suspended as droplets within the organic phase composition. The organic phase composition typically contains a non-polar organic solvent and an optional suspending agent. The organic phase used during the formation of polymeric beads is not miscible with water. As used herein with reference to the organic phase, the term "not miscible" means that the organic phase does not dissolve in water. Generally, at least 95 weight percent, at least 97 weight percent, at least 98 weight percent, at least 99 weight percent, at least 99.5 weight percent, at least 99.8 weight percent, or at least 99.9 weight percent of the organic phase is not soluble in water.

The organic phase typically contains a non-polar organic solvent and an optional suspending agent (i.e., polymeric stabilizer). The volume ratio of organic phase to the aqueous phase composition is usually in the range of 2:1 to 6:1. Besides functioning as an inert medium for dispersion or suspension of the aqueous phase composition, the primary purpose of the organic phase is to dissipate the heat generated during the polymerization reaction. In some embodiments, the density of the organic phase composition can be selected to be approximately equal to the density of the aqueous phase composition. Approximately matching these densities tends to result in the formation of more spherical polymeric beads as well as more uniformly sized polymeric beads.

Suitable non-polar organic solvents are typically alkanes such as hexane, heptane, n-octane, isooctane, isododecane, and cyclohexane; halogenated hydrocarbons such as carbon tetrachloride, chloroform, and methylene chloride; aromatics such as benzene and toluene; low-viscosity silicone oils; or combinations thereof. For example, the non-polar organic solvent can be a mixture of heptane and methylene chloride or a mixture of heptane and toluene.

A suspending agent can be added to facilitate suspension of droplets of the aqueous phase in the non-polar organic solvent. The suspending agent usually has both hydrophobic and hydrophilic portions but is soluble in the organic solvent. The suspending agent functions to modify the interfacial tension between the aqueous phase and the non-polar organic solvent. Additionally, the suspending agent provides steric stabilization of the aqueous phase composition droplets. This steric stabilization tends to minimize or prevent the formation of agglomerated polymeric beads during the polymerization process.

Suitable suspending agents include sorbitan sesquioleate, polyethylene oxide sorbitan trioleate (e.g., polyethylene oxide (20) sorbitan trioleate), polyethylene oxide sorbitan monooleate (e.g., polyethylene oxide (20) sorbitan monooleate), sorbitan trioleate, sodium di-2-ethylhexylsulfosuccinate, a copolymer of isooctylacrylate and acrylic acid, a copolymer of hexylacrylate and sodium acrylate, a copolymer of isooctylacrylate and 2-acrylamidoisobutyramide, and the like. The amount of the suspending agent can influence the size of resulting polymeric beads. That is, the use of larger amounts of suspending agent often results in the formation of smaller polymeric beads. The amount of the suspending agent, if present, is generally 0.1 to 10 weight percent based on the total weight of the monomers in the monomer mixture. For example, the monomer mixture can contain 0.1 to 8 weight percent or 0.5 to 5 weight percent suspending agent based on the total weight of monomers.

Compared to the organic aggregates, the suspending agent has different solubility characteristics in the organic phase and in the aqueous phase. The suspending agent is soluble in the organic phase although some suspending agents may be soluble in both the organic phase and the aqueous phase. In contrast, the organic aggregates are predominately in the aqueous phase and are either dispersed or suspended within the aqueous phase. The organic aggregates are not soluble in the aqueous phase.

In a second aspect, a method is provided for preparing a porous polymeric resin. The method includes forming an aqueous phase composition that contains 1) a monomer mixture capable of free radical polymerization, 2) dispersed or suspended organic aggregates in the size range of 0.05 to 5 micrometers, and 3) an aqueous phase solvent that includes water and optionally a polar organic solvent that is miscible with water. The monomer mixture includes i) a crosslinking monomer and ii) a functional monomer. The crosslinking monomer contains a compound of Formula (I)

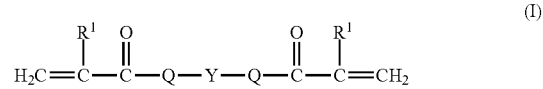

wherein $R^1$ is hydrogen or methyl; Q is oxy or —NH—; and Y is an alkylene or heteroalkylene. The alkylene or heteroalkylene Y group is unsubstituted or substituted with a hydroxyl group. The functional monomer contains (a) an ethylenically unsaturated group and (b) a first functional group selected from (1) an acidic group or salt thereof, (2) an amino group or a salt thereof, (3) a hydroxyl group, (4) an azlactone group, (5) a glycidyl group, or (6) a combination thereof. The method further includes polymerizing the monomer mixture to form a polymeric material that contains the organic aggregates and then removing at least a portion of the organic aggregates from the polymeric material to form the porous polymeric resin. In some embodiments of this method of preparing the polymeric resin, droplets of the aqueous phase composition are dispersed or suspended in an organic phase that is not miscible with water and that contains a non-polar organic solvent. The resulting porous polymeric resin contains porous polymeric beads.

An initiator can be added to the aqueous phase composition to commence the free radical polymerization reaction. The free radical initiator is usually soluble in the aqueous phase solvent. The free radical initiator can be activated thermally, photochemically, or through an oxidation-reduction reaction. The free radical initiator is often used in an amount of 0.02 to 10 weight percent based on the total weight of the monomers in the monomer mixture. In some examples, the free radical initiator is present in an amount of 2 to 6 weight percent based on the total weight of the monomers.

Suitable water-soluble thermal initiators include, for example, azo compounds, peroxides or hydroperoxides, persulfates, and the like. Exemplary azo compounds include 2,2'-azobis[2-(2-imidazolin-2-yl)propane]dihydrochloride, 2,2'-azobis(2-amidinopropane)dihydrochloride, and 4,4'-azobis-(4-cyanopentanoic acid). Examples of commercially available azo compounds that can be thermal initiators include materials available from DuPont Specialty Chemical (Wilmington, Del.) under the "VAZO" trade designation such as VAZO 44, VAZO 56, and VAZO 68. Suitable peroxides and hydroperoxides include acetyl peroxide, tert-butyl hydroperoxide, cumene hydroperoxide, and peroxyacetic acid. Suitable persulfates include, for example, sodium persulfate and ammonium persulfate.

In other examples, the free radical initiator is a redox couple such as ammonium or sodium persulfate and N,N,N',N'-tetramethylethylenediamine (TMEDA); ammonium or sodium persulfate and ferrous ammonium sulfate; hydrogen peroxide and ferrous ammonium sulfate; cumene hydroperoxide and N,N-dimethylaniline; or the like.

The polymerization temperature typically depends on the specific free radical initiator chosen. The polymerization temperature is usually about 50° C. to about 150° C. for thermally initiated polymerizations. In some methods, the temperature is about 55° C. to about 100° C. For redox or photochemically initiated polymerizations, the temperature can be close to room temperature or below, if desired. The polymerization time can be about 30 minutes to about 24 hours or more. Typically, a polymerization time of 2 to 4 hours is sufficient.

As the free radical polymerization reaction proceeds, many polymeric molecules are formed within the aqueous phase. The polymeric molecules continue to grow and crosslink as the reaction proceeds. When the molecular weight becomes sufficiently large, a polymeric material separates from the aqueous phase composition. Although not wanting to be bound by theory, it is believed that the secondary porous structure having pores with an average pore diameter greater than about 500 nanometers results from the entrapment of the organic aggregates within the polymeric material and subsequent removal of the organic aggregates from the polymeric material. The organic aggregates are typically free of groups that form a chemical bond with the polymeric material. The organic aggregates typically can be removed, at least partially, from the polymeric material by washing with water, with a polar organic solvent, or with a combination thereof. In some examples, the pore diameter of the secondary porous structure may be substantially equal to the diameter of the organic aggregates. In other examples, the pore diameter of the secondary porous structure may be several times the size of the organic aggregate and can be as large as about 15 to 20 micrometers. Although not wanting to be bound by theory, it is believed that these large pores are the result of partial coalescence of the organic aggregates prior to or during the polymerization process.

Further, it is believed that the primary porous structure having an average pore diameter less than about 200 nanometers results from the interaction of the aqueous phase solvent and any optional porogens with the polymeric material as the molecular weight increases. When the aqueous phase solvent is a good solvent for the forming polymeric material, phase separation within the aqueous phase may not take place and a solvent-swollen gel-type primary porous structure tends to form. Conversely, when the aqueous phase solvent and any optional porogens are relatively poor solvents for the forming polymeric material, phase separation of the polymeric material can occur and a macroporous primary porous structure tends to form.

Whether or not phase separation occurs as well as the point at which phase separation occurs within the aqueous phase can be influenced by the compatibility and by the amount of the various aqueous phase components such as any optional polar organic solvent or porogen with the forming polymeric material. Additionally, phase separation can be influenced by the amount of crosslinking monomer present in the monomer mixture, with larger amounts of crosslinking monomer typically favoring earlier phase separation due to a more rapid increase in the molecular weight of the polymeric material.

If there is phase separation during the formation of the polymeric resin, the point at which this phase separation occurs can influence the average pore size and the pore size distribution of the primary porous structure. The addition of polar organic solvents and porogens that are compatible with the forming polymeric material (i.e., polar organic solvents and porogens that are good solvents for the forming polymeric material) tend to result in a later phase separation. A later phase separation tends to favor the formation of polymeric resins that have smaller pores within the primary porous structure and that have larger surface areas. Conversely, that addition of polar organic solvents and porogens with a lower solubility for the forming polymeric material tend to result in the formation of polymeric resins that have larger pores within the primary porous structure and smaller surface areas. An earlier phase separation tends to favor the formation of polymeric resins that have larger pores within the primary porous structure and smaller surface areas.

In some embodiments of making the porous polymeric resin, porous polymeric beads are formed. This method of preparing polymeric beads is a reverse phase or an inverse suspension polymerization process. An aqueous phase composition is prepared as described above. The method further involves dispersing or suspending droplets of the aqueous phase composition in an organic phase that is not miscible with water. The volume of the organic phase is typically greater than the volume of the aqueous phase composition. The organic phase typically contains a non-polar solvent and an optional suspending agent. The method still further includes polymerizing the monomer mixture to form polymeric particles that contain the organic aggregates and then removing at least a portion of the organic aggregates from the polymeric particles to form porous polymeric beads.

The polymeric particle size is determined, to a large extent, by the size of the aqueous phase composition droplets. The droplet size can be affected by variables such as the rate of agitation, temperature, amount of suspending agent, choice of suspending agent, choice of non-polar organic solvent, and choice of any aqueous phase polar organic solvent. The rate of agitation, the type of suspending agent, and the amount of suspending agent can often be varied to control the aggregation or agglomeration of the resulting polymeric beads. A lack of aggregation is generally preferred.

The resulting polymeric particles can be isolated, for example, by filtration or decantation. The polymeric particles can then be subjected to a series of washing steps to remove at least a portion of the organic aggregates and optional porogen. Suitable solvents for removing the organic aggregates and the porogen include polar organic solvents such as, for example, water, acetone, alcohols (e.g., methanol, ethanol, n-propanol, and iso-propanol), dimethylsulfoxide, dimethylformamide, N-methylpyrrolidone, acetonitrile, and the like. The washed polymeric beads can be dried using any suitable method, if desired. In some methods, the polymeric beads can be fractionated using techniques such as screening, sedimentation, and air classification.

In a third aspect, a method is provided for purifying or separating a target compound. The method includes forming a porous polymeric resin as described above. The method further includes contacting the porous polymeric resin with a sample containing a target compound such that the target compound reacts with or interacts with at least one of the functional groups of the porous polymeric resin. The functional groups are selected from (1) an acidic group or salt thereof, (2) an amino group or salt thereof, (3) a hydroxyl group, (4) an azlactone group, (5) a glycidyl group, or (6) a combination thereof. In some embodiments, the porous polymeric resin is in the form of porous polymeric beads.

A target compound can be separated from the other sample constituents or can be purified. In some embodiments, the target compound is a biomolecule such as, for example, a virus, protein, enzyme, vaccine, DNA, and RNA. In some applications, the composition of the sample can be adjusted to enhance the likelihood that the target compound in the sample can react or interact with one of the functional groups on the polymeric resin. For example, the sample pH can be adjusted to optimize the separation or purification of charge-carrying biomolecules using polymeric resins having functional groups selected from an acidic group, a salt of an acidic group, a basic group, or a salt of a basic group.

If the functional group is an acidic group or salt thereof, the polymeric resin can function as a cation exchange resin. A sample can be contacted with a polymeric resin at a pH where the polymeric resin has negatively charged groups and the target compound has a positively charged group. The target compound can be adsorbed on the polymeric resin. To release the adsorbed target compound from the polymeric resin, the pH can be raised (e.g., the pH is raised to at least 6 or 7 or higher). Alternatively, when the target compound is a biomolecule, the sample can be contacted with and adsorbed on the polymeric resin in a low ionic strength buffer (e.g., 5 to 50 millimolar buffer salt plus 0 to 200 millimolar sodium chloride) at a pH of about 3 to 10 or at a pH of about 4 to 6. To release the adsorbed biomolecule, the cation exchange resin is often contacted with a high ionic strength buffer. In some embodiments, the high ionic strength buffer includes that same buffer composition used to adsorb the target compound plus 1 molar sodium chloride. The adsorption and release processes are typically performed at temperatures near room temperature.

Buffer salts useful for controlling pH for cation exchange resins include, but are not limited to, sodium phosphate, sodium carbonate, sodium bicarbonate, sodium borate, sodium acetate, and TRIS (tris(hydroxymethyl)aminomethane). Other suitable buffers include "Good's" buffers such as MOPS (3-morpholinopropanesulfonic acid), EPPS (4-(2-hydroxyethyl)piperazine-1-propanesulfonic acid), MES (2-morpholinoethanesulfonic acid), and others.

If the functional group is an amino group or a salt thereof, the polymeric resin can function as an anion exchange resin. A sample can be contacted with an anion exchange resin at a pH where the anion exchange resin has positively charged groups (e.g., at a pH of 1 to 10) and the target compound has a negatively charged group. In general, in order to get effective adsorption of the negatively charged target compound to the anion exchange resin, a pH of at least about 1 to 2 pH units above the pK of the target compound (or pI for a protein) can be used. To release the adsorbed target compound from the anion exchange resin, if desired, the pH can be lowered at least 1 to 2 pH units, or more. Alternatively, when the charged target compound is a biomolecule, the sample can be contacted with the anion exchange resin in a low ionic strength buffer (e.g., a 5 to 20 millimolar buffer salt) at an appropriate pH (e.g., at a pH of about 6-8 for bovine serum albumin) To release the adsorbed biomolecule, the anionic exchange resin is often contacted with a high ionic strength buffer. In some embodiments, the high ionic strength buffer includes that same buffer composition used to adsorb the target compound plus 1 molar sodium chloride. The adsorption and release processes are typically performed at temperatures near room temperature.

Buffer salts useful for controlling pH for anion exchange resins include, but are not limited to, sodium phosphate, sodium carbonate, sodium bicarbonate, sodium borate, sodium acetate, and TRIS (tris(hydroxymethyl)aminomethane). Other suitable buffers include "Good's" buffers such as MOPS (3-morpholinopropanesulfonic acid), EPPS (4-(2-hydroxyethyl)piperazine-1-propanesulfonic acid), MES (2-morpholinoethanesulfonic acid), and others.

If the functional group on the polymeric resin is a hydroxyl group, the polymeric resin can be used as a size exclusion resin. Alternatively, the polymeric resin can be used to purify or separate a target compound having a group that can react with the hydroxyl group. For example, a sample containing a target compound having a carboxy group can react with the hydroxyl group through a condensation reaction to form an ester. In this example, the reaction results in the covalent attachment of the target compound to the polymeric resin through a carbonyloxy group.

If the functional group on the polymeric resin is an azlactone group, a sample containing a target compound having a nucleophilic group can react with the azlactone group through a ring opening reaction. Suitable nucleophilic groups for reacting with an azlactone group include, but are not limited to, primary amino groups, secondary amino groups, and hydroxyl groups. The reaction of the azlactone group with a nucleophilic group of the target compound usually results in the formation of a linkage group that covalently connects the target compound to the polymeric resin. The linkage group formed by ring opening of the azlactone group often contains the group —(CO)NHC($R^a$)$_2$(CH$_2$)$_p$(CO)— where $R^a$ is an alkyl such as methyl, p is equal to 0 or 1, and (CO) denotes a carbonyl.

If the functional group on the polymeric resin is a glycidyl group, a sample containing a target compound having a nucleophilic group can react with the glycidyl group through a ring opening reaction. Suitable nucleophilic groups for reacting with a glycidyl group include, but are not limited to, primary amino groups, secondary amino groups, thiol groups, and carboxy groups. The reaction of the glycidyl group with a nucleophilic group of the target compound usually results in the formation of a linkage group that covalently connects the target compound to the polymeric resin. The linkage group formed by ring opening of the glycidyl group often contains the group —C(OH)HCH$_2$NH— when the glycidyl group is reacted with a primary amino group or —C(OH)HCH$_2$O(CO)— when the glycidyl group is reacted with a carboxy group.

In a fourth aspect, another method is provided for purifying or separating a target compound. This method includes forming porous polymeric resins, as described above, that contain a first functional group selected from (1) an acidic group or salt thereof, (2) an amino group or salt thereof, (3) a hydroxyl group, (4) an azlactone group, (5) a glycidyl group, or (6) a combination thereof. The method further includes preparing a modified polymeric resin by treating the porous polymeric resins with a modifying agent and converting the first functional group to a second functional group. The modified porous polymeric resin having the second functional group is then contacted with a sample containing the target compound. The target compound reacts or interacts with the second functional group of the modified porous polymeric resin.

The modifying agent can be any compound that can react or interact with the first functional group. In some examples, the modifying agent is a compound that includes a nucleophilic group plus a second functional group. In other examples, the modifying agent is a compound that includes a carboxy group plus a second functional group. The second functional group is different from the first functional group. If the modifying agent is a biomolecule, the attached biomolecule can have a functional group that can interact or react with a complementary group of another biomolecule.

In some embodiments, a modifying agent can react with a first functional group that is a hydroxyl group. For example, a hydroxyl group can react with a modifying agent having a carboxy group to attach the modifying agent to the polymeric resin through a carbonyloxy-containing linkage. The carboxy group can be on a biomolecule such as a protein and the reaction with the hydroxy group results in the attachment of the protein to the polymeric resin. The resulting modified polymeric resin functions as an affinity resin. That is, the attached biomolecule can function as an affinity ligand to react with or interact with a complementary biomolecule (i.e., the attached biomolecule has a second functional group that can react or interact with a complementary functional group of another biomolecule).

In other embodiments, a modifying agent can react with a first functional group that is a glycidyl group or an azlactone group. Either of these first functional groups can undergo a ring-opening reaction with a modifying agent having a nucleophilic group. The reaction of the modifying agent with the first functional group results in the attachment of the modifying agent to the polymeric resin. The modifying agent can be, for example, a biomolecule that can function as an affinity ligand (i.e., the second functional group is an affinity ligand) to react or interact with a complementary biomolecule. The resulting modified polymeric resin can function as an affinity resin. In other examples, the modifying agent can provide an ionic charge (i.e., the second functional group is an ionic group) to react or interact with a target compound having an opposite ionic charge. The resulting modified polymeric resin can function as an ion exchange resin. Alternatively, the modified polymeric resin can function as a size exclusion resin. In still other examples, the modifying agent can provide a hydrophobic group that can react or interact with a target compound having a hydrophobic group. The resulting modified polymeric resin can function as a hydrophobic interaction resin or as a reverse phase resin. In yet other examples, the modifying agent can provide a metal-chelating group that can react or interact with various metal-containing species. The resulting modified polymeric resin can function as a chelating resin. In further examples, the modifying agent can provide an antibody that can in turn bind with a cell resulting in the attachment of the cell to the polymeric resin. That is, the modified polymeric resin can function as a cell selection resin. In still further examples, the modifying agent can be an enzyme. The resulting modified polymeric resin can function as an immobilized enzyme resin and can be used as a catalyst when exposed to certain target compounds.

In some embodiments of the method of purifying or separating a target compound, the porous polymeric resin can be placed in a column to prepare a chromatographic column. If the polymeric resin is treated with a modifying agent to alter the functional group available for reaction or interaction with a target compound, the modification can be prior to or after placement of the polymeric resins in the column. Suitable columns are known in the art and can be constructed of such materials as glass, polymers, stainless steel, titanium and alloys thereof, or nickel and alloys thereof. Methods of filling the column to effectively pack the polymeric resin in the column are known in the art.

The polymeric resins are often fairly rigid and have the mechanical strength needed for use in chromatographic columns of any suitable dimension under any suitable flow rate and pressure conditions. The polymeric resins can be used, for example, in a chromatographic column with high flow rates. The polymeric resins are suitable for use under the differential pressure conditions that are commonly encountered in chromatographic columns. As used herein, the term "differential pressure" refers to the pressure drop across a chromatographic column. For example, chromatographic columns used for the downstream purification or separation of therapeutic proteins can be used with superficial velocities (e.g., flow rates) such as at least 150 cm/hr, at least 250 cm/hr, at least 500 cm/hr, or at least 700 cm/hr to increase productivity. Faster flow rates typically lead to higher productivity.

The chromatographic columns can be part of an analytical instrument such as a liquid chromatograph. When packed with the polymeric resins, the chromatographic column can be used to separate or purify a target compound. The target compound can react or interact with the functional groups on the polymeric resin. Alternatively, impurities in the sample can be removed resulting in an increase in the concentration of the target compound in the sample. The amount of the target compound or impurities in a sample containing the target compound can be determined.

The chromatographic columns alternatively can be part of a preparative liquid chromatographic system to separate or purify a target compound. The preparative liquid chromatographic system can be a laboratory scale system, a pilot plant scale system, or an industrial scale system.

In other embodiments of the method of purifying or separating a target compound, the porous polymeric resin is disposed on a surface of a filtration medium. If the polymeric resin is treated with a modifying agent to alter the functional group available for reaction or interaction with a target compound, the modification can be prior to or after disposing the polymeric resin on the surface of the filtration medium. The filter element can be positioned within a housing to provide a filter cartridge. Suitable filtration medium and systems that include a filter cartridge are further described, for example, in U.S. Pat. No. 5,468,847 (Heilmann et al.). Such a filter cartridge can be used, for example, to purify or separate biomolecules. Less rigid particles or smaller porous polymeric resins can be utilized within a filter cartridge compared to within a chromatographic column due to the lower pressure drops inherent in the filter cartridge system.

The filtration medium can have a single filtration layer or multiple filtration layers and can be prepared from glass or polymeric fibers (e.g., polyolefin fibers such as polypropylene fibers). In some embodiments, the filtration medium includes a coarse pre-filtration layer and one or more filtration layers that are finer. For example, the filtration medium can include a coarse pre-filtration layer and then a series of additional filtration layers with progressively smaller average pore sizes. The polymeric resin can be positioned on the layer of the filtration medium having the smallest average pore size.

Selection of the pore size of the filtration medium depends on the size of the polymeric resin. Typically the pore size of the filtration medium is selected to be smaller than the average diameter of the polymeric resin. However, a portion of the polymeric resin can penetrate into the filtration medium.

The filtration medium can be in the form of vertical pleated filters such as those described in U.S. Pat. No. 3,058,594 (Hultgren). In other embodiments, the filtration medium is in the form of horizontal, compound radially pleated filters such as those described in U.S. Pat. No. 4,842,739 (Tang et al.). A horizontal arrangement of the pleats can be desirable in applications where a filter cartridge containing the filtration medium is used in the vertical direction. Such an arrangement can reduce the loss of the polymeric resin from the filter element during use and storage.

In other embodiments of the method of purifying or separating a target compound, the porous polymeric resin is incorporated in a continuous, porous matrix. If the polymeric resin is treated with a modifying agent to alter the functional group available for reaction or interaction with a target compound, the modification can be prior to or after incorporation in the continuous, porous matrix. The continuous, porous matrix is typically a woven or non-woven fibrous web, porous fiber, porous membrane, porous film, hollow fiber, or tube. Suitable continuous, porous matrixes are further described in U.S. Pat. No. 5,993,935 (Rasmussen et al.).

A continuous, porous matrix that is a fibrous web can provide advantages such as, for example, large surface area, ease of manufacture, low material cost, and a variety of fiber textures and densities. Although a wide range of fiber diameters are suitable, the fibers often have an average diameter of 0.05 micrometers to 50 micrometers. The web thickness can be varied to fit the end use application (e.g., about 0.2 micrometers to about 100 cm).

The composite material can be prepared, for example, using melt-blowing methods. For example, a molten polymeric material can be extruded to produce a stream of melt blown fibers. The polymeric resin can be introduced into the stream of fibers and intermixed with the fibers. The mixture of fibers and polymeric resin can be collected on a screen such that a web is formed. The polymeric resin can be dispersed within the fibrous web. In some embodiments, the polymeric resin can be dispersed uniformly throughout the fibrous web.

The composite material can also be prepared with a fibrillated polymer matrix such as fibrillated polytetrafluoroethylene (PTFE). Suitable methods are more fully described in U.S. Pat. No. 4,153,661 (Ree et al.); U.S. Pat. No. 4,565,663 (Errede et al.); U.S. Pat. No. 4,810,381 (Hagen et al.); and U.S. Pat. No. 4,971,736 (Hagen et al.). In general, these methods involve blending the polymeric resin with a polytetrafluoroethylene dispersion to obtain a putty-like mass, subjecting the putty-like mass to intensive mixing at a temperature of 5° C. to 100° C. to cause fibrillation of the PTFE, biaxially calendaring the putty-like mass, and drying the resultant sheet.

In another method of preparing the composite material, the polymeric resin can be dispersed in a liquid and then blended with a thermoplastic polymer at a temperature sufficient to form a homogenous mixture. The homogeneous mixture can be placed in a mold having a desired shape. Upon cooling of the mixture, the liquid can be phase separated leaving a thermoplastic polymeric matrix that contains dispersed polymeric particles. This method is further described in U.S. Pat. No. 4,957,943 (McAllister et al.).

The amount of polymeric resin incorporated into the continuous, porous matrix is at least 1 volume percent, at least 5 volume percent, at least 10 volume percent, at least 20 volume percent, at least 30 volume percent, at least 40 volume percent, or at least 50 volume percent based on the volume of the resulting composite. The amount of polymeric resin incorporated into the continuous, porous matrix can contain up to 99 volume percent, up to 95 volume percent, up to 90 volume percent, up to 85 volume percent, or up to 80 volume percent based on the volume of the resulting composite. Composites having a larger amount of polymeric resin tend to have a larger capacity.

In a fifth aspect, a porous polymeric resin is provided. The porous polymeric resin is the reaction product of a monomer mixture that includes a) a crosslinking monomer and b) a functional monomer. The crosslinking monomer includes a compound of Formula (I)

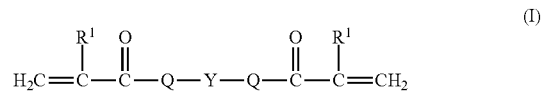

(I)

wherein $R^1$ is hydrogen or methyl; Q is oxy or —NH—; and Y is an alkylene or heteroalkylene, wherein Y can be optionally substituted with a hydroxyl group. The functional monomer contains (a) an ethylenically unsaturated group and (b) a first functional group selected from (1) an acidic group or salt thereof, (2) an amino group or salt thereof, (3) a hydroxyl group, (4) an azlactone group, (5) a glycidyl group, or (6) a combination thereof. All of the monomers in the monomer mixture have a lipophilicity index no greater than 20. The polymeric resin has a hierarchical porous structure that includes a first set of pores having an average pore diameter 200 nanometers and a second set of pores having an average pore diameter greater than 500 nanometers.

The polymeric resins can have any desired shape. The shape can be regular or irregular. In some embodiments, the polymeric resins are in the form of polymeric beads that are spherical or substantially spherical. In other embodiments, the polymeric resin is in the form of a monolith. The monolith can have any shape such as the shape of the container used to prepare the polymeric resin. The monolith can be cut, fractured, milled, or the like. For example, particles of polymeric resin can be formed from the monolith. The particles can have a regular or irregular shape.

When the polymeric resins are polymeric beads, the average size of the polymeric beads can be determined using techniques such as light scattering or electron microscopy with image analysis. The polymeric beads usually have an average diameter of at least 10 micrometers. For example, the polymeric beads can have an average diameter of at least 20 micrometers, at least 30 micrometers, at least 40 micrometers, at least 50 micrometers, or at least 60 micrometers. The polymeric beads usually have an average diameter no greater than 2,000 micrometers, no greater than 1,000 micrometers, no greater than 500 micrometers, or no greater than 200 micrometers. In some applications, the macroporous polymeric beads have an average diameter of 10 to 2,000 micrometers, 20 to 2,000 micrometers, 20 to 500 micrometers, 50 to 500 micrometers, 20 to 200 micrometers, 50 to 200 micrometer, 50 to 100 micrometers, 50 to 75 micrometers, 50 to 70 micrometers, or 60 to 70 micrometers.

The polymeric resins typically have a primary porous structure and a secondary porous structure. The primary porous structure is associated with the bulk polymer matrix. This porous structure is essentially the same porous structure that would be formed in the absence of the organic aggregates. This primary porous structure often has an average pore diameter that is less than about 200 nanometers (nm) although some pores larger than this may be present. The primary porous structure can be influenced by the addition of an optional porogen or optional non-polar solvent in the aqueous phase composition. Inclusion of the organic aggregates in the aqueous phase composition leads to a secondary porous structure having large pores (e.g., cavities or voids) within the bead. The average diameter of these pores is generally greater than about 500 nm. The average pore size for the secondary pores can be greater than 1 micrometer, greater than 2 micrometers, greater than 5 micrometers, or greater than 10 micrometers. Some of the pores in the secondary pore structure can be as large as about 15 to 20 micrometers. These cavities may have open communication with one another (i.e., open cell configuration) or they may have a closed cell configuration. In this later case, however, they still have communication with one another via the primary porous structure. The secondary pores may or may not have openings to the exterior of the bead.

Both the primary and the secondary porous structure often can be observed in the polymeric resins using various microscopic techniques such as scanning electron microscopy. In addition, the secondary porous structure is typically large enough that it can be observed by ordinary optical microscopy. The primary porous structure can be characterized using nitrogen adsorption under cryogenic conditions.

The combination of porous structures is particularly advantageous for the purification or separation of relatively large target compounds such as biomolecules. The secondary porous structure having an average size greater than about 500 nanometers provides easier access of the relatively large target compounds to the interior regions of the polymeric resins. The primary porous structure having an average pore diameter less than about 200 nanometers can typically provide adequate surface area and capacity for the target compound.

When the primary porous structure is macroporous, the surface area is usually at least 20 $m^2/g$, at least 30 $m^2/g$, or at least 40 $m^2/g$. The surface area is often in the range of 20 to 350 $m^2/g$, in the range of 30 to 200 $m^2/g$, in the range of 20 to 100 $m^2/g$, in the range of 30 to 100 $m^2/g$, or in the range of 40 to 350 $m^2/g$.

The capacity of the polymeric resins can be given in terms of the amount of the target compound that can interact or react with the polymeric resins. For example, polymeric resins that function as cation exchange resins can interact with various target compounds that have a positively charged group. More particularly, the cation exchange capacity can be given in terms of the amount of a specific protein such as immunoglobin (e.g., IgG) that can be adsorbed by the polymeric resins.

The foregoing describes the invention in terms of embodiments foreseen by the inventor for which an enabling description was available, notwithstanding that insubstantial modifications of the invention, not presently foreseen, may nonetheless represent equivalents thereto.

EXAMPLES

These examples are for illustrative purposes and are not meant to be limiting on the scope of the appended claims. Solvents and other reagents used were obtained from Sigma-Aldrich Chemical Company (Milwaukee, Wis.) unless otherwise noted.

Test Methods

Cation Exchange Capacity for Immunoglobulin G (IgG)

A 50 volume percent slurry of cation exchange polymeric beads was prepared by mixing the polymeric beads with deionized water, centrifuging at 3000 relative centrifugal force (rcf) for 20 minutes to form a packed bead bed, and then adjusting the amount of deionized water so that the total volume was twice that of the packed bead bed. The slurry was mixed well to suspend the polymeric beads, and then a 400 microliter sample of the slurry was pipetted into a 5 mL, 0.45 micrometer cellulose acetate centrifugal microfilter that is commercially available under the trade designation CENTREX MF through VWR (Eagan, Minn.). The water was removed by centrifugation at 3000 rcf for 5 minutes. The polymeric beads were then mixed with 4 mL of a buffer containing 50 mM sodium acetate and 80 mM sodium chloride at pH 4.5. The sample was centrifuged again at 3000 rcf for 10 minutes. The supernate was discarded. Then a 4.5 mL sample of human IgG, which was obtained from Equitech-Bio (Kerrville, Tex.), having a concentration of about 7 mg/mL in the same acetate buffer was added to the filter containing the polymeric beads. The mixture was mixed by tumbling overnight, and then the supernate was removed from the polymeric beads by centrifugation at 3000 rcf for 20 min.

The supernate was analyzed by UV spectroscopy. The absorbance of the sample at 280 nm was compared to that of the starting IgG solution. The difference was used to calculate the IgG capacity of the polymeric beads. Assays were run in triplicate and averaged.

Dynamic Binding Capacity (DBC) for Immunoglobulin G (IgG)

An aqueous slurry of polymeric beads (approximately 350 microliter total volume of polymeric beads) was packed into a 5 centimeters by 0.3 centimeter inner diameter glass column commercially available under the trade designation OMNIFIT from Chromtech (Apple Valley, Minn.), placed on a Fast Protein Liquid Chromatograph commercially available under the trade designation AKTA from GE Healthcare (Uppsala, Sweden), and equilibrated for 10 column volumes with Buffer A (50 mM acetate, 40 mM NaCl, and pH 4.5) at 0.7 mL/minute. The challenge solution (5.0 mg/mL human IgG in buffer A) was loaded through a 50 mL super loop at 0.09 mL/min (3.93 minutes residence time/76 cm/hr) until 7 mL of sample was loaded or the UV absorbance at a wavelength of 280 nanometers ($A_{280}$) exceeded 800 mAU (whichever came first). A washout of unbound sample was performed by flowing Buffer A at 0.7 mL/min flow rate for 18 column volumes. This was followed by gradient elution with Buffer B (50 mM acetate, 1.0 M NaCl, pH 4.5) from 0 volume percent Buffer B (100 volume percent Buffer A) to 100 volume percent Buffer B (0 volume percent Buffer A) over 8 column volumes and remained at 100 volume percent Buffer B for 10 column volumes. The Buffer B solution eluted the bound IgG. The amount of IgG bound to the support was determined at the point where the concentration of the solution exiting the column during the initial loading was 10 percent of the initial IgG challenge solution concentration (the plateau of non-binding proteins was subtracted out). The column was then re-equilibrated by flowing 20 column volumes of Buffer A.

Small Ion Capacity (SIC) for Hydrogen Ion

Approximately 8 mL of a polymeric bead slurry (approximately 50 volume percent in deionized water) was transferred to a 15 mL graduated centrifuge tube and centrifuged at 3000 relative centrifugal force (rcf) for 5 minutes. The volume of the resulting packed polymeric beads was recorded to the nearest 0.1 mL and the slurry was transferred quantitatively to a sintered glass funnel and washed with deionized water (3×50 mL), with 0.5N HCl (3×50 mL), and then again with deionized water (3×50 mL). The washed polymeric beads were then quantitatively transferred to a 125 mL Erlenmeyer flask and 4.0 mL of 2M NaCl was added to displace the hydrogen ions. After 5 minutes, 2 drops of phenolphthalein (1 gram in 100 mL ethanol) were added to the slurry and the mixture was titrated (while mixing on a magnetic stir plate) with 0.1 N NaOH until the solution was faint pink. The small ion capacity in micromoles per mL of polymeric beads was calculated by dividing the volume of 0.1 NaOH added by the volume of beads analyzed and multiplying by 100.

| Table of Abbreviations | |
|---|---|
| Abbreviation or Trade Designation | Description |
| MBA | N,N'-methylenebisacrylamide |
| AMPS | 2-acrylamido-2-methylpropanesulfonic acid commercially available as a 50% aqueous solution of the sodium salt, AMPS 2405 Monomer, from Lubrizol Corp., Wickliffe, Ohio. |
| IPA | Isopropanol |
| TMEDA | N,N,N',N'-tetramethylethylenediamine. |
| VDM | 2-vinyl-4,4-dimethylazlactone from SNPE, Princeton, NJ. |
| TMPTMA | trimethylolpropane trimethacrylate |
| TEGDMA | triethylene glycol dimethacrylate |
| PEG-Acr 375 | poly(ethylene glycol) monoacrylate having a weight average molecular weight of about 375 grams/mole |
| MAPTAC | methacrylamido-propyl trimethylammonium chloride commercially available as a 50% aqueous solution |
| MA | Methacrylamide |
| HEMA | 2-hydroxyethyl methacrylate |
| GMA | glycidyl methacrylate |
| MeOH | Methanol |
| PEG 6000 | Polyethylene glycol having a weight average molecular weight of about 6000 grams/mole |
| Suspending Agent 1 | A 91.8:8.2 by weight Copolymer of isooctylacrylate and 2-acrylamidoisobutyramide that was prepared as described in Rasmussen, et al., Makromol. Chem., Macromol. Symp., 54/55, 535-550 (1992) |
| Suspending Agent 2 | A 95:5 by weight copolymer of isooctylacrylate and acrylic acid that was prepared by free radical polymerization in ethyl acetate |
| PETROLITE D110 | A 10 weight percent aqueous dispersion of ethoxylated wax obtained from Baker Petrolite (Sugar Land, TX) |
| UNITHOX D-100 | A 25 percent by weight aqueous dispersion of ethoxylated wax with an average particle size diameter of about 0.5 micrometers |
| UNITHOX D-300 | A 23 percent by weight aqueous dispersion of ethoxylated wax with an average particle diameter of about 0.5 micrometer |
| PETROLITE D-800 | A 50 percent by weight aqueous dispersion of paraffin wax with an average particle diameter of about 0.7 micrometers |
| PETROLITE D-900 | A 40 percent by weight aqueous dispersion of microcrystalline wax with an average particle diameter of about 0.7 micrometers |

Example 1

Polymeric beads were prepared by reverse-phase suspension polymerization using a monomer mixture that contained a 35:65 by weight ratio of AMPS to MBA. PETROLITE D110 was added to the aqueous phase as the organic aggregates.

More specifically, the organic phase was prepared by adding Suspending Agent 1 (0.56 grams), and heptane (536 mL) to a flask equipped with a mechanical stirrer (stirring rate 450 rpm), nitrogen inlet, thermometer, heating mantel with temperature controller, and condenser. The organic phase in the flask was heated to 35° C. while stirring and was sparged with nitrogen for 15 minutes.

The aqueous phase was prepared by combining MBA (18.2 grams), AMPS (19.6 grams of a 50% by weight aqueous solution), IPA (85 mL), 5 ml of PETROLITE D110, deionized water (27.2 mL), PEG 6000 (10 grams of a 50 percent by weight aqueous solution), and ethylene glycol (20 mL). This aqueous phase was stirred and heated at a temperature in the range of 30-35° C. to dissolve the MBA. Sodium persulfate (0.5 grams) dissolved in deionized water (3 mL) was added to the aqueous phase with additional stirring. The aqueous phase was added to the reaction flask containing the organic phase. The resulting mixture was stirred and sparged with nitrogen for 10 minutes.

TMEDA (0.5 mL) was added to initiate the polymerization. The reaction temperature quickly rose to 43.5° C. and then slowly subsided. The reaction mixture was stirred for a total of 2 hours from the time of TMEDA addition and then filtered using a sintered glass funnel. The reaction product was washed with acetone (2×250 mL), methanol (2×250 mL), and acetone (2×250 mL). The washed product was classified using water as the flowing liquid on a Ro-Tap Model RX-29 classifier (W. S. Tyler, Mentor, Ohio) to yield colorless polymeric beads in the size range from 38-106 micrometers.

Scanning Electron Microscopy (SEM) and optical microscopy were used to verify that the polymeric beads had multiple large (greater than 0.5 micrometer diameter) pores surrounded by a macroporous polymer matrix. The cation exchange capacity, which was determined by the method described above using IgG (weight average molecular weight equal to 150,000 g/mole), was 62 mg/mL and the dynamic binding capacity (DBC), which was determined by the method described above using IgG, was 41 mg/mL.

Comparative Example 1

A 35:65 by weight AMPS/MBA copolymer cation exchange bead was prepared by reverse-phase suspension polymerization. The aqueous phase did not contain dispersed or suspended organic aggregates.

More specifically, the organic phase was prepared by adding Suspending Agent 1 (0.56 grams) and heptane (536 mL) to a flask equipped with a mechanical stirrer (stirring rate 450 rpm), nitrogen inlet, thermometer, heating mantel with temperature controller, and condenser. The organic phase in the flask was heated to 35° C. with stirring and sparged with nitrogen for 15 minutes.

The aqueous phase was prepared that contained MBA (18.2 grams), AMPS (19.6 grams of a 50% by weight aqueous solution), IPA (85 mL), deionized water (32.2 mL), PEG 6000 (10 grams of a 50 percent by weight aqueous solution), and ethylene glycol (20 ml). This aqueous solution was stirred and heated at 30 to 35° C. to dissolve the MBA. Sodium persulfate (0.5 grams) dissolved in deionized water (3 mL) was added to the aqueous solution with additional stirring. The aqueous solution was added to the reaction flask containing the organic phase. The resulting mixture was stirred and sparged with nitrogen for 10 minutes.

TMEDA (0.5 mL) was added to initiate the polymerization. The reaction temperature quickly rose to 44.5° C. and then slowly subsided. The reaction mixture was stirred for a total of 2 hours from the time of TMEDA addition, filtered using a sintered glass funnel, washed with acetone (2×250 mL), methanol (2×250 mL), acetone (2×250 mL), and wet classified using water as the flowing liquid on a Ro-Tap Model RX-29 classifier (W. S. Tyler, Mentor, Ohio) to yield colorless particles in the size range from 38-106 micrometers.

Cation exchange capacity for IgG was 67 mg/mL. Dynamic binding capacity (DBC) for IgG was 34 mg/mL.

Examples 2-5

Polymeric beads were prepared by reverse-phase suspension polymerization using a monomer mixture that contained a 35:65 by weight ratio of AMPS to MBA. Various aqueous dispersions of organic aggregates were added to the aqueous phase. Example 2 contained UNITHOX D-100. Example 3 contained UNITHOX D-300. Example 4 contained PETROLITE D-800. Example 5 contained PETROLITE D-900.

More specifically, the organic phase was prepared by adding Suspending Agent 1 (0.56 grams) and heptane (536 mL) to a flask equipped with a mechanical stirrer (stirring rate 450 rpm), nitrogen inlet, thermometer, heating mantel with temperature controller, and condenser. The organic phase in the flask was heated to 35° C. with stirring and sparged with nitrogen for 15 minutes.

The aqueous phase was prepared that contained MBA (18.2 grams), AMPS (19.6 grams of a 50 percent by weight aqueous solution), IPA (85 mL), 10 mL of the appropriate aqueous dispersion containing organic aggregates as described above, deionized water (22.2 mL), PEG 6000 (10 grams of a 50 percent by weight aqueous solution), and ethylene glycol (20 mL). This aqueous solution was stirred and heated at a temperature in the range of 30-35° C. to dissolve the MBA. Sodium persulfate (0.5 grams) dissolved in deionized water (3 mL) was added to the aqueous phase with additional stirring. The aqueous phase was added to the reaction flask containing the organic phase. The resulting mixture was stirred and sparged with nitrogen for 10 minutes.

TMEDA (0.5 mL) was added to initiate the polymerization. The reaction temperature quickly rose to 40-45° C. and then slowly subsided. The reaction mixture was stirred for a total of 2 hours from the time of TMEDA addition, filtered using a sintered glass funnel, washed with acetone (2×250 mL), methanol (2×250 mL), acetone (2×250 mL), and wet classified using water as the flowing liquid on a Ro-Tap Model RX-29 classifier (W. S. Tyler, Mentor, Ohio) to yield colorless particles in the size range from 38-106 micrometers.

Figure 4:
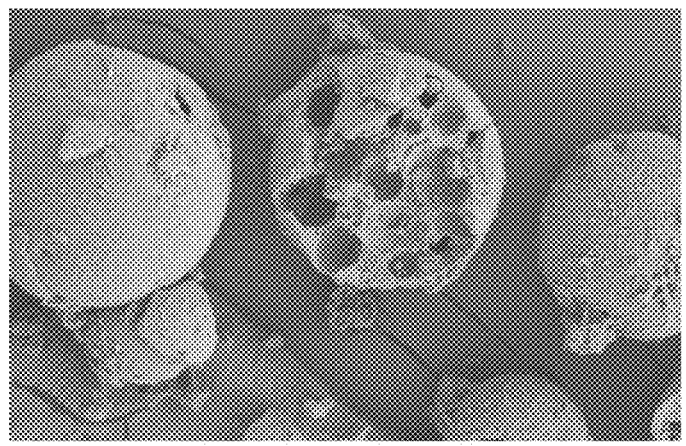
FIG. 4 is a scanning electron micrograph of an exemplary porous polymeric bead (prepared in Example 4) having both a primary and secondary porous structure.
Figure 5:
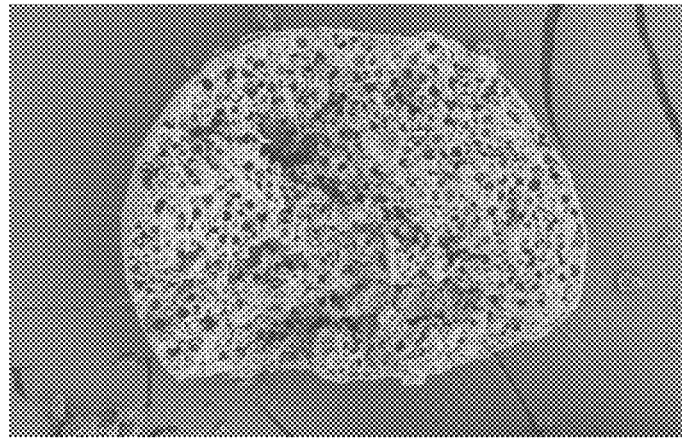
FIG. 5 is a scanning electron micrograph of yet other exemplary porous polymeric beads (prepared in Example 5) having a primary and secondary porous structure.

SEM and optical microscopy verified that the polymeric beads had multiple large voids surrounded by a typical macroporous polymer matrix. The SEM for Example 4 is shown in FIG. 4 and the SEM for Example 5 is shown in FIG. 5. FIG. 3 is an optical micrograph of Example 4; the magnification is 64×.

Example 6

Polymeric beads were prepared by reverse-phase suspension polymerization using a monomer mixture that contained a 5:95 by weight ratio of VDM to MBA. PETROLITE D-110 was the source of the organic aggregates.

More particularly, the organic phase was prepared by adding Suspending Agent 2 (0.27 grams), toluene (188 mL), and heptane (348 mL) to a 1000 mL round-bottomed flask (Morton type) equipped with a mechanical stirrer (stirring rate 450 rpm), nitrogen inlet, thermometer, heating mantel with temperature controller, and condenser. The organic phase in the flask was heated to 35° C. with stirring and sparged with nitrogen for 15 minutes.

The aqueous phase was prepared that contained MBA (13.3 grams), deionized water (45 mL), IPA (90 mL), and PETROLITE D-110 (10 mL). This aqueous solution was stirred and heated at 30 to 35° C. until the MBA dissolved. Sodium persulfate (0.55 grams) dissolved in deionized water (5 mL) was added to the aqueous solution with additional stirring. The aqueous solution was added to the reaction flask containing the non-aqueous solution. VDM (0.72 mL) was added by syringe to the stirring mixture. The resulting mixture was stirred and nitrogen sparged for 5 minutes.

TMEDA (0.55 mL) was added to initiate the polymerization. The temperature rose to 40.1° C. over 5 minutes. Heating and stirring was continued for a total of 2 hours after initiation, then the beaded product was filtered and washed with acetone (3×250 mL). The wet filter cake was transferred to a one-necked round-bottomed flask and dried at room temperature overnight under vacuum.

Scanning electron micrographs showed that the polymeric beads had multiple large (greater than about 1 micrometer diameter) pores surrounded by a typical macroporous matrix (see FIG. 1).

Example 7

Polymeric beads were prepared by reverse-phase suspension polymerization using a monomer mixture that contained a 5:95 by weight ratio of VDM to MBA. The procedure was similar to that of Example 6 except for a variation in the amount of PETROLITE D-110 (1 mL) and deionized water (54 mL) that were used in the aqueous phase. Scanning electron micrographs showed that the polymeric beads had multiple large (greater than about 1 micrometer diameter) pores surrounded by a typical macroporous matrix.

Comparative Example 2

Polymeric beads were prepared by the procedure of Example 6 except that the PETROLITE D-110 was replaced by an equivalent volume of deionized water. That is, the polymeric beads were prepared without organic aggregates in the aqueous phase.

Scanning electron micrographs indicated that the polymeric beads had a typical macroporous matrix structure but lacked large pores greater than 1 micrometer (see FIG. 2).

Example 8

Polymeric beads were prepared by reverse-phase suspension polymerization using a monomer mixture that contained 45:25:30 AMPS/MBA/TMPTMA. PETROLITE D-900 was the source of the organic aggregates.

The organic phase was prepared by adding Suspending Agent 1 (0.28 grams) and heptane (536 mL) to a flask equipped with a mechanical stirrer (stirring rate 450 rpm), nitrogen inlet, thermometer, heating mantel with temperature controller, and condenser. The organic phase was heated to 35° C. with stirring and sparged with nitrogen for 15 minutes.

The aqueous phase was prepared that contained MBA (7.0 grams), AMPS (25.2 grams of a 50% by weight aqueous solution), TMPTMA (8.4 grams), IPA (110 mL), deionized water (22.4 mL), and PETROLITE D-900 (10 mL). This aqueous solution was stirred and heated at 30 to 35° C. to dissolve the MBA. Sodium persulfate (0.5 grams) dissolved in deionized water (5 mL) was added to the aqueous solution with additional stirring. The aqueous solution was added to the reaction flask containing the organic phase. The resulting mixture was stirred and nitrogen sparged for 10 minutes.

TMEDA (0.5 mL) was added to initiate the polymerization. The reaction temperature quickly increased about 10° C. and then slowly subsided. The reaction mixture was stirred for a total of 2 hours from the time of TMEDA addition, filtered using a sintered glass funnel, washed with acetone (2×250 mL), methanol (2×250 mL), acetone (2×250 mL), and wet classified using water as the flowing liquid on a Ro-Tap Model RX-29 classifier (W. S. Tyler, Mentor, Ohio) to yield colorless particles in the size range from 38-106 micrometers.

SEM and optical microscopy verified that the polymeric bead had multiple large pores surrounded by a typical macroporous polymer matrix.

Example 9

Polymeric beads were prepared by reverse-phase suspension polymerization using a monomer mixture that contained 35:55:10 by weight AMPS/MBA/TEGDMA. PETROLITE D-1038 was the source of the organic aggregates. The procedure was similar to that used for Example 8 but with a different aqueous phase composition. The aqueous phase contained MBA (15.4 grams), AMPS (19.6 grams of a 50 percent by weight aqueous solution), TEGDMA (2.8 grams), IPA (110 mL), deionized water (25.2 mL), and PETROLITE D-1038 (10 mL).

SEM and optical microscopy verified that the polymeric beads had multiple large (greater than about 0.5 micrometer diameter) pores surrounded by a typical macroporous polymer matrix.

Example 10

Polymeric beads were prepared by reverse-phase suspension polymerization using a monomer mixture that contained 35:55:10 by weight AMPS/MBA/PEG-Acr 375. PETROLITE D-900 was the source of the organic aggregates. The procedure was similar to that used for Example 8 but with a different aqueous phase composition. The aqueous phase contained MBA (15.4 grams), AMPS (19.6 grams of a 50 percent by weight aqueous solution), PEG-Acr 375 (2.8 grams), IPA (110 mL), deionized water (25.2 mL), and PETROLITE D-900 (10 mL).

SEM and optical microscopy verified that the polymeric beads had multiple large (greater than about 0.5 micrometer diameter) pores surrounded by a typical macroporous polymer matrix.

Example 11

Polymeric beads were prepared by reverse phase suspension polymerization using a monomer mixture that contained 50:50 by weight MAPTAC/MBA. The procedure was similar to that of Example 8 except for changes in the composition of both the organic and aqueous phases. The organic phase contained Suspending Agent 1 (0.28 grams), heptane (243 mL), and toluene (132 mL). The aqueous phase contained MBA (14.0 grams), MAPTAC (28.0 grams of a 50% by weight aqueous solution), MeOH (50 mL), deionized water (21.0 mL), and PETROLITE D-900 (10 mL).

SEM and optical microscopy verified that the polymeric beads had multiple large (greater than about 0.5 micrometer diameter) pores surrounded by a typical macroporous polymer matrix.

Example 12

Polymeric beads were prepared by reverse phase suspension polymerization using a monomer mixture that contained 65:30:5 by weight MBA/MA/HEMA. The procedure was similar to that of Example 8 except for changes in the composition of both the organic phase and the aqueous phase. The organic phase contained the Suspending Agent 1 (0.13 grams), heptane (348 mL), and toluene (188 mL). The aqueous phase contained MBA (9.1 grams), MA (4.2 grams), HEMA (0.67 grams), IPA (80 mL), deionized water (45.0 mL), and PETROLITE D-1038 (10 mL).

SEM and optical microscopy verified that the polymeric beads had multiple large (greater than about 0.5 micrometer diameter) pores surrounded by a typical macroporous polymer matrix.

Example 13

Polymeric beads were prepared by reverse phase suspension polymerization using a monomer mixture that contained 5:95 by weight GMA/MBA. The procedure was similar to that of Example 6 except for a different aqueous phase composition. More particularly, VDM was substituted with GMA (0.72 mL), 80 mL of IPA was used instead of 90 mL of IPA, and PETROLITE D-110 (10 mL) was substituted with PETROLITE D-900 (10 mL).

SEM and optical microscopy verified the presence of multiple large (greater than about 0.5 micrometer diameter) pores surrounded by a typical macroporous polymer matrix.

Example 14

A 65:35 by weight AMPS/MBA copolymer was prepared by reverse-phase suspension polymerization using a procedure similar to that of Example 1. The aqueous phase solution contained MBA (9.8 grams), AMPS (36.3 ml of a 50% by weight aqueous solution), IPA (80 mL), deionized water (20 mL), sodium persulfate (0.5 grams), and PETROLITE D-110 (31.8 mL).

SEM and optical microscopy verified that the polymeric beads had multiple large (greater than about 0.5 micrometer diameter) pores surrounded by a typical macroporous polymer matrix.

Example 15

A 30 weight percent aqueous polystyrene latex was prepared by standard aqueous emulsion polymerization of styrene, resulting in a dispersion of 0.4 micrometer sized particles.

Polymeric beads were prepared by reverse-phase suspension polymerization using a monomer mixture that contained a 45:55 by weight ratio of AMPS to MBA. More specifically, the organic phase was prepared by adding Suspending Agent 1 (0.56 grams) and heptane (536 mL) to a flask equipped with a mechanical stirrer (stirring rate 450 rpm), nitrogen inlet, thermometer, heating mantel with temperature controller, and condenser. The organic phase in the flask was heated to 35° C. with stirring and was sparged with nitrogen for 15 minutes.

The aqueous phase was prepared by combining MBA (15.4 grams), AMPS (25.2 grams of a 50% by weight aqueous solution), IPA (85 mL), 3.3 ml of the above polystyrene latex, deionized water (25.1 mL), PEG 6000 (10 grams of a 50 percent by weight aqueous solution), and ethylene glycol (20 mL). This aqueous phase was stirred and heated at a temperature in the range of 30-35° C. to dissolve the MBA. Sodium persulfate (0.5 grams) dissolved in deionized water (5 mL) was added to the aqueous phase with additional stirring. The aqueous phase was added to the reaction flask containing the organic phase. The resulting mixture was stirred and sparged with nitrogen for 10 minutes.

TMEDA (0.5 mL) was added to initiate the polymerization. The reaction temperature quickly rose to 44.0° C. and then slowly subsided. The reaction mixture was stirred for a total of 2 hours from the time of TMEDA addition and then filtered using a sintered glass funnel. The reaction product was washed with acetone (2×250 mL), methanol (2×250 mL), and acetone (2×250 mL).

Scanning electron micrographs showed the presence of multiple large (greater than 0.5 micrometer diameter) pores surrounded by a typical macroporous matrix.

Example 16

A 38 weight percent aqueous dispersion of acrylate microspheres was prepared according to procedures similar to those described in U.S. Patent Application 2003/0104042 A1 for use as an organic aggregate-containing dispersion. More specifically, a monomer mixture was prepared by dissolving 8 grams of acrylic acid (obtained from Sigma-Aldrich, Milwaukee, Wis.), 11.8 grams of polyethylene oxide acrylate (obtained from Shin-Nakamura, Arimoto, Japan, under the trade designation M90G NK ESTER), and 1.1 grams of benzoyl peroxide (70% in water; obtained from Arkema Inc., Philadelphia, Pa., under the trade designation LUCIDOL-70) in 377 grams of iso-octyl acrylate (obtained from 3M Company). A surfactant solution was prepared by dissolving 6.4 grams of ammonium lauryl sulfate (from Cognis Corp, Hoboken, N.J. under the trade designation STANDAPOL A) in 595 grams of water. The monomer mixture then was added to the surfactant solution, and the resulting mixture was emulsified using a mixer (obtained from J. W. Greer, Wilmington, Mass. under the trade designation GIFFORD-WOOD) until the droplet size was less than 1 micrometer. The emulsion was charged to a 1 liter baffled reactor, heated to 65° C., degassed with nitrogen and allowed to react for 8 hours. Microspheres having a mean particle diameter of 2 micrometers resulted.

Polymeric beads were prepared by reverse-phase suspension polymerization using a monomer mixture that contained a 45:55 by weight ratio of AMPS to MBA. More specifically, the organic phase was prepared by adding Suspending Agent 1 (0.56 grams) and heptane (536 mL) to a flask equipped with a mechanical stirrer (stirring rate 450 rpm), nitrogen inlet, thermometer, heating mantel with temperature controller, and condenser. The organic phase in the flask was heated to 35° C. with stirring and was sparged with nitrogen for 15 minutes.

The aqueous phase was prepared by combining MBA (15.4 grams), AMPS (25.2 grams of a 50% by weight aqueous solution), IPA (85 mL), 10.0 ml of acrylate latex, deionized water (27.4 mL), PEG 6000 (10 grams of a 50 percent by weight aqueous solution), and ethylene glycol (20 mL). This aqueous phase was stirred and heated at a temperature in the range of 30-35° C. to dissolve the MBA. Sodium persulfate (0.5 grams) dissolved in deionized water (5 mL) was added to the aqueous phase with additional stirring. The aqueous phase was added to the reaction flask containing the organic phase. The resulting mixture was stirred and sparged with nitrogen for 10 minutes.

TMEDA (0.5 mL) was added to initiate the polymerization. The reaction temperature quickly rose to 43.9° C. and then slowly subsided. The reaction mixture was stirred for a total of 2 hours from the time of TMEDA addition and then filtered using a sintered glass funnel. The reaction product was washed with acetone (2×250 mL), methanol (2×250 mL), and acetone (2×250 mL).

Scanning electron micrographs showed that the polymeric beads had multiple large (greater than about 2 micrometer diameter) pores surrounded by a typical macroporous matrix.

Comparative Example 3

Polymeric beads were prepared by reverse phase suspension polymerization using a monomer mixture that contained 45:55 by weight AMPS/MBA. The aqueous phase did not contain organic aggregates.

More specifically, the organic phase was prepared by adding Suspending Agent 1 (0.56 grams) and heptane (536 mL) to a flask equipped with a mechanical stirrer (stirring rate 450 rpm), nitrogen inlet, thermometer, heating mantel with temperature controller, and condenser. The organic phase in the flask was heated to 35° C. with stirring and sparged with nitrogen for 15 minutes.

The aqueous phase was prepared that contained MBA (15.4 grams), AMPS (25.2 grams of a 50% by weight aqueous solution), IPA (85 mL), deionized water (27.4 mL), PEG 6000 (10 grams of a 50 percent by weight aqueous solution), and ethyleneglycol (20 ml). This aqueous solution was stirred and heated at 30 to 35° C. to dissolve the MBA. Sodium persulfate (0.5 grams) dissolved in deionized water (5 mL) was added to the aqueous solution with additional stirring. The aqueous solution was added to the reaction flask containing the non-aqueous solution. The resulting mixture was stirred and sparged with nitrogen for 10 minutes.

TMEDA (0.5 mL) was added to initiate the polymerization. The reaction temperature quickly rose to 43.6° C. and then slowly subsided. The reaction mixture was stirred for a total of 2 hours from the time of TMEDA addition, filtered using a sintered glass funnel, washed with acetone (2×250 mL), methanol (2×250 mL), acetone (2×250 mL).

Scanning electron micrographs indicated a typical macroporous matrix structure and the absence of large pores greater than 0.5 micrometer.

Example 17

A 35:65 by weight AMPS/MBA polymeric monolith was prepared. More specifically, in a 50 mL Ehrlenmeyer flask, an aqueous phase mixture was prepared that contained MBA (1.14 grams), AMPS (1.22 grams of a 50% by weight aqueous solution), IPA (5.3 mL), deionized water (1.24 mL), PEG 6000 (0.625 grams of a 50 percent by weight aqueous solution), and ethyleneglycol (1.25 ml). This aqueous solution was stirred and heated at 30 to 35° C. to dissolve the MBA. The mixture was transferred to a 15 mL polypropylene centrifuge tube, and Petrolite D-800 (0.625 grams) was added. Sodium persulfate (0.34 mL of a 0.1 mg/mL solution in DI water) was added, then the mixture was sparged with nitrogen gas for 1 minute. TMEDA (35 µL) was added, the mixture was vortexed, loosely capped, and allowed to stand in a test tube rack for 2 hours and 15 minutes. The solid monolith which had formed was broken up with a spatula, filtered, washed with acetone (2×15 mL), methanol (2×15 mL), and acetone (2×15 mL), and dried in a vacuum oven overnight at room temperature.

Scanning electron micrographs showed the presence of multiple large (greater than 0.5 micrometer diameter) pores surrounded by a typical macroporous matrix.

Example 18

A 35:65 by weight AMPS/MBA copolymer cation exchange monolith was prepared as in Example 17, except that Petrolite D-900 was substituted for D-800. Scanning electron micrographs showed the presence of multiple large (greater than 0.5 micrometer diameter) pores surrounded by a typical macroporous matrix.

We claim:
1. A porous polymeric resin having a hierarchical porous structure comprising 1) a first porous structure comprising a first set of pores associated with a bulk polymeric matrix and having an average pore diameter less than 200 nanometers and 2) a second porous structure comprising a second set of pores having an average pore diameter greater than 500 nanometers and that are distinct from the first set of pores, the porous polymeric resin comprising the reaction product of a reaction mixture comprising an aqueous phase monomer mixture wherein all or substantially all of the monomers in the monomer mixture have a lipophilicity index no greater than 20, the monomer mixture comprising
  a) a crosslinking monomer of Formula (I)

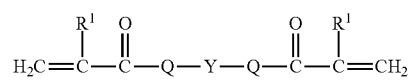

in an amount of 55 to 99 weight percent based on a total weight of the monomer mixture,
wherein
  $R^1$ is hydrogen or methyl;
  Q is oxy or —NH—; and
  Y is an alkylene or heteroalkylene, wherein Y can be optionally substituted with a hydroxyl group; and
  b) a functional monomer having (a) an ethylenically unsaturated group and (b) a first functional group selected from (1) an acidic group or a salt thereof, (2) an amino group or a salt thereof, (3) a hydroxyl group, (4) an azlactone group, (5) a glycidyl group, or (6) a combination thereof.

2. The porous polymeric resin of claim 1, wherein the porous polymeric resin is a porous polymeric bead.

3. The porous polymeric resin of claim 1, wherein the porous polymeric resin is a monolith.

4. The porous polymeric resin of claim 1, wherein the functional monomer has an acidic group or a salt thereof and wherein the polymeric porous resin is a cation exchange resin.

5. The porous polymeric resin of claim 1, wherein the functional monomer has an amino group or a salt thereof, the polymeric porous resin being an anion exchange resin.

6. The porous polymeric resin of claim 1, wherein the functional monomer has a hydroxyl group, the polymeric porous resin being a size exclusion resin.

7. A modified polymeric resin comprising the reaction product of a modifying agent and the porous polymeric resin of claim 1, wherein the modifying agent reacts with the first functional group to covalently attach the modifying agent to the porous polymeric resin.

8. The modified polymeric resin of claim 7, wherein the modifying agent is a biomolecule.

9. The modified polymeric resin of claim 8, wherein the biomolecule is a protein, virus, vaccine, antibody, enzyme, nucleic acid, DNA, or RNA.

10. The modified polymeric resin of claim 7, wherein the functional monomer has a first functional group that is a hydroxyl and the modifying agent has a carboxyl group.

11. The modified polymeric resin of claim 7, wherein the functional monomer has a first functional group that is an azlactone group and the modifying agent has a nucleophilic group.

12. The modified polymeric resin of claim 7, wherein the functional monomer has a first functional group that is a glycidyl group and the modifying agent has a nucleophilic group.

13. The modified polymeric resin of claim 8, wherein the attached biomolecule has functional group that is capable of reacting or interacting with a complementary functional group on another biomolecule, the modified polymeric resin being an affinity resin.

14. The modified polymeric resin of claim 7, wherein the modifying agent has an ionic group that is capable of reacting or interacting with a target compound having an opposite charge, the modified polymeric resin being an ion exchange resin or a size exclusion resin.

15. The modified polymeric resin of claim 7, wherein the modifying agent has hydrophobic group that is capable of reacting or interacting with a target compound having a hydrophobic group, the modified polymeric resin being a reverse phase resin or a hydrophobic interaction resin.

16. The modified polymeric resin of claim 7, wherein the modifying agent has a metal-chelating group that is capable of reacting or interacting with a metal-containing species, the modified polymeric resin being a chelating resin.

17. The modified polymeric resin of claim 7, wherein the modifying agent is an antibody that is capable of binding with a cell, the modified polymeric resin being a cell selection resin.

18. The modified polymeric resin of claim 7, wherein the modifying agent is an enzyme, the modified polymeric resin being an enzyme resin.

19. A porous polymeric resin having a hierarchical porous structure comprising 1) a first porous structure comprising a first set of pores associated with a bulk polymeric matrix and having an average pore diameter less than 200 nanometers and 2) a second porous structure comprising a second set of pores having an average pore diameter greater than 500 nanometers and that are distinct from the first set of pores, the porous polymeric resin comprising the reaction product of a reaction mixture comprising an aqueous phase monomer mixture wherein all or substantially all of the monomers in the monomer mixture have a lipophilicity index no greater than 20, the monomer mixture comprising
  a) a crosslinking monomer of Formula (I)

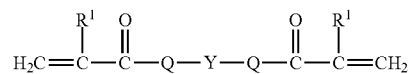

in an amount of 55 to 99 weight percent based on a total weight of the monomer mixture,
wherein
  $R^1$ is hydrogen or methyl;
  Q is oxy or —NH—; and
  Y is an alkylene or heteroalkylene, wherein Y can be optionally substituted with a hydroxyl group; and
  b) a functional monomer having (a) an ethylenically unsaturated group and (b) a first functional group selected from (1) an acidic group or a salt thereof, (2) an amino group or a salt thereof, (3) a hydroxyl group, (4) an azlactone group, (5) a glycidyl group, or (6) a combination thereof, wherein a scanning electron micrograph of the porous polymeric resin shows multiple pores corresponding to the first porous structure and multiple pores corresponding to the second porous structure.

* * * * *

UNITED STATES PATENT AND TRADEMARK OFFICE
CERTIFICATE OF CORRECTION

PATENT NO.        : 9,725,545 B2
APPLICATION NO.   : 14/204324
DATED             : August 8, 2017
INVENTOR(S)       : Peter Wickert Page 1 of 1

It is certified that error appears in the above-identified patent and that said Letters Patent is hereby corrected as shown below:

In the Specification

Column 12
Line 54, delete "3-imidazoylpropyl)" and insert -- 3-imidazolylpropyl) --, therefor.

Column 13
Line 64, delete "(i e," and insert -- (i.e., --, therefor.

Column 14
Line 23, delete "phenethylamine With" and insert -- phenethylamine. With --, therefor.
Lines 39-40, delete "octyldecylamine With" and insert -- octyldecylamine. With --, therefor.

Column 15
Line 12, delete "glucoamylase Immobilized" and insert -- glucoamylase. Immobilized --, therefor.

Column 21
Line 44, delete "pentaerithritol," and insert -- pentaerythritol, --, therefor.

Column 26
Line 34, delete "albumin) To" and insert -- albumin). To --, therefor.

Column 32
Line 19, delete "immunoglobin" and insert -- immunoglobulin --, therefor.

Column 41
Line 47 (approx.), delete "Ehrlenmeyer" and insert -- Erlenmeyer --, therefor.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*